(12) United States Patent
Baret et al.

(10) Patent No.: US 9,152,617 B2
(45) Date of Patent: Oct. 6, 2015

(54) SYSTEM AND METHOD FOR PROCESSING OBJECTS

(75) Inventors: Olivier Baret, Paris (FR); Valery Anisimov, Saint Petersburg (RU); Sergey Maximov, Saint Petersburg (RU); Vadim Pepelka, Saint Petersburg (RU)

(73) Assignee: A2iA S.A., Paris (FR)

( * ) Notice: Subject to any disclaimer, the term of this patent is extended or adjusted under 35 U.S.C. 154(b) by 842 days.

(21) Appl. No.: 13/014,593

(22) Filed: Jan. 26, 2011

(65) Prior Publication Data

US 2011/0225526 A1    Sep. 15, 2011

Related U.S. Application Data

(60) Provisional application No. 61/340,060, filed on Mar. 11, 2010.

(51) Int. Cl.
*G06K 9/00* (2006.01)
*G06F 17/30* (2006.01)
*G06K 9/80* (2006.01)
*G06F 17/24* (2006.01)
(Continued)

(52) U.S. Cl.
CPC ............ *G06F 17/245* (2013.01); *G06K 9/2054* (2013.01); *G06Q 10/10* (2013.01); *G06K 2209/01* (2013.01)

(58) Field of Classification Search
CPC .. G06K 2209/01; G06K 9/2054; G06Q 10/10
USPC ........................................................ 715/764
See application file for complete search history.

(56) References Cited

U.S. PATENT DOCUMENTS 4,034,343 A   7/1977   Wilmer
4,933,984 A   6/1990   Nakano et al.
5,001,769 A   3/1991   Reid-Green et al.
(Continued)

OTHER PUBLICATIONS

Lin, W.C., Hsu, C.C., "Location of specific items in a document, without using character recognition techniques," Eng. Appli. of AI, 1988, vol. 1, September, pp. 194-202.
(Continued)

*Primary Examiner* — Jordany Nunez
(74) *Attorney, Agent, or Firm* — Mintz Levin Cohn Ferris Glovsky and Popeo, P.C.

(57) ABSTRACT

A system, method, and computer program product for processing of objects are disclosed. A processor coupled to a graphical user interface is configured to display an object. The processor receives input from a user concerning the object, wherein input relates to at least a partial location of the object, as a mouse position close to the object, a line approximately covering the vertical or horizontal extent of the object, or a box approximately covering the object. The processor provides input to a keying module, wherein the keying module processes the received input and provides the input to a recognition engine. The recognition engine is in communication with the keying module. Based on the received input, the recognition engine provides an exact information concerning the received input to the keying module, as an exact location, a recognition result, and a confidence score qualifying the reliability of the recognition results. The keying module generates an enhanced information about the object based on the information received from the recognition engine and predetermined information concerning the object.

39 Claims, 31 Drawing Sheets

(51) Int. Cl.
*G06K 9/20* (2006.01)
*G06Q 10/10* (2012.01)

(56) References Cited

U.S. PATENT DOCUMENTS

| | | | |
|---|---|---|---|
| 5,038,392 A | 8/1991 | Morris et al. | |
| 5,101,447 A | 3/1992 | Sokoloff et al. | |
| 5,131,053 A | 7/1992 | Bernzott et al. | |
| 5,159,667 A | 10/1992 | Borrey et al. | |
| 5,191,525 A | 3/1993 | LeBrun et al. | |
| 5,228,100 A * | 7/1993 | Takeda et al. | 382/175 |
| 5,258,855 A | 11/1993 | Lech et al. | |
| 5,369,508 A | 11/1994 | Lech et al. | |
| 5,404,294 A | 4/1995 | Karnik | |
| 5,625,465 A | 4/1997 | Lech et al. | |
| 5,768,416 A | 6/1998 | Lech et al. | |
| 5,852,676 A | 12/1998 | Lazar | |
| 5,910,988 A | 6/1999 | Ballard | |
| 6,032,137 A | 2/2000 | Ballard | |
| 6,094,505 A | 7/2000 | Lech et al. | |
| 6,512,848 B2 | 1/2003 | Wang et al. | |
| 6,798,913 B2 | 9/2004 | Toriyama | |
| 7,525,694 B2 | 4/2009 | Nishida | |
| 7,684,037 B2 | 3/2010 | Harrison et al. | |
| 7,778,457 B2 | 8/2010 | Nepomniachtchi et al. | |
| 8,396,246 B2 * | 3/2013 | Anbalagan et al. | 382/100 |
| 8,867,779 B2 * | 10/2014 | Anbalagan et al. | 382/100 |
| 2002/0181777 A1 * | 12/2002 | Sumikawa et al. | 382/202 |
| 2004/0109605 A1 | 6/2004 | Uchida | |
| 2006/0088214 A1 * | 4/2006 | Handley et al. | 382/176 |
| 2006/0209175 A1 * | 9/2006 | Cohen et al. | 348/14.01 |
| 2007/0143398 A1 * | 6/2007 | Graham | 709/204 |
| 2008/0137954 A1 | 6/2008 | Tang et al. | |
| 2009/0094260 A1 * | 4/2009 | Cheng et al. | 707/100 |
| 2009/0324137 A1 * | 12/2009 | Stallings et al. | 382/306 |
| 2010/0008578 A1 | 1/2010 | Eguchi et al. | |
| 2010/0061634 A1 * | 3/2010 | Howie | 382/176 |
| 2011/0013810 A1 * | 1/2011 | Engstrom et al. | 382/118 |
| 2011/0150267 A1 * | 6/2011 | Snelling et al. | 382/100 |
| 2011/0238495 A1 * | 9/2011 | Kang | 705/14.49 |

OTHER PUBLICATIONS

Lin, W.C., Hsu, C.C., "An automated system for document recognition," Eng. Appli. of AI, 1989, vol. 2, June, pp. 120-130.

Wiggins, R.E., "Document Image Processing—New Light on an Old Problem," International Journal of Information Management, 1990, 10, pp. 297-302.

\* cited by examiner

FIG. 3.

EXPLANATION OF BENEFITS

Date: 01/01/2000
Identification: ABCDEFG

Patient Name: Mary Jones
Claim ID: 123456ABC   Received: 01/01/2000 Member ID: 6789EFG
Member: Mary Jones
Group Name: ABC Co.                                Group No.: ABCDEFG123456

| Date | Code | Submitted Charges | Allowable Amount | Copay | Not Allowable | Deductible | Co Insurance | Patient Resp. | Payable |
|---|---|---|---|---|---|---|---|---|---|
| 01/01/2000 | 1234 | $100.00 | | | $90.00 | | $5.00 | $2.00 | $3.00 |
| 01/01/2000 | 5678 | $15.00 | | | $10.00 | | | | $10.00 |
| 01/01/2000 | 9101 | $15.00 | | | $10.00 | | | | $10.00 |
| Totals | | $130.00 | | | $110.00 | | $5.00 | $2.00 | $23.00 |

Remarks:

Total Patient Responsibility:   $2.00
Claim Payment:   $0.00

FIG. 5.

| DATA GRID | | | | | |
|---|---|---|---|---|---|
| Entity Name | Field Name | Simple Value | Collapsed Cell | New Occurrence | Total Value |
| | | | | | |
| | | | | | |
| | | | | | |
| | | | | | |
| | | | | | |
| | | | | | |
| | | | | | |

FIG. 6

GENERAL HOSPITAL
123 MAIN STREET
ANYTOWN, STATE 11111

Name: Mary Jones
Address: 456 Any Street, Main Town, State 12345
Telephone: (123) 456-7890

Plan: 123456789ABCDEF
Date: 01/01/2000

| Patient No.: | 123456 | Admitted | Released | | | |
|---|---|---|---|---|---|---|
| Outpatient | | 01/01/2000 | 01/01/2000 | | | |
| Code | Description | Date | Code | Amount | Unit | Total |
| Procedure ABC | | | | | | $100,000 |
| 13 | Radiology | | | | | $100,000 |
| ABC101 | Fluoroscopy | 01/01/2000 | ABC201 | $50,000 | 1 | $50,000 |
| ABC102 | Radiography | 01/01/2000 | ABC201 | $50,000 | 1 | $50,000 |
| Procedure EFG | | | | | | $200,000 |
| 13 | Orthopedics and Trauma | | | | | |
| EFG101 | Procedures: | 01/01/2000 | EFG201 | $200,000 | 1 | $200,000 |
| | Procedure 1 | | | $50,000 | 1 | |
| | Procedure 2 | | | $35,000 | 1 | |
| | Procedure 3 | | | $45,000 | 1 | |
| | Procedure 4 | | | $70,000 | 1 | |
| Medications | | | | | | $50,000 |
| 425 | Medications | | | | | $25,000 |
| HJK101 | Medication 1 | 01/01/2000 | HJK201 | $15,000 | 2 | $15,000 |
| HJK102 | Medication 2 | 01/01/2000 | HJK202 | $5,000 | 1 | $5,000 |
| HJK103 | Medication 3 | 01/01/2000 | HJK203 | $5,000 | 1 | $5,000 |
| 0123 | Liquid Medications | | | | | $50,000 |
| LMN101 | Medication 1 | 01/01/2000 | LMN201 | $50,000 | 1 | $50,000 |
| Devices | | | | | | |
| 1000 | Hospital Instruments | | | | | $200,000 |
| OPQ101 | Catheters | 01/01/2000 | OPQ201 | $100,000 | 3 | $100,000 |
| OPQ102 | Cannulas | 01/01/2000 | OPQ202 | $100,000 | 5 | $100,000 |

FIG. 7

GENERAL HOSPITAL
123 MAIN STREET
ANYTOWN, STATE 11111

Name: Mary Jones                                              Plan: 123456789ABCDEF
Address: 456 Any Street, Main Town, State 12345               Date: 01/01/2000
Telephone: (123) 456-7890

| Patient No.: | 123456 | Admitted | Released | Policy No. | 111111111 | |
|---|---|---|---|---|---|---|
| Outpatient | | 01/01/2000 | 01/01/2000 | | | |

| Code | Description | Unit | Amount | Total |
|---|---|---|---|---|
| 101 | Consultation | 1 | $10,000 | $10,000 |
| | Sub-Total Consultation | | | $10,000 |
| 102 | Radiography 1 | 1 | $15,000 | $15,000 |
| 103 | Radiography 2 | 1 | $15,000 | $15,000 |
| 104 | Radiography 3 | 1 | $15,000 | $15,000 |
| | Sub-Total Radiography | | | $45,000 |
| 105 | Test 1 | 1 | $17,000 | $17,000 |
| 106 | Test 2 | 1 | $17,000 | $17,000 |
| 107 | Test 3 | 1 | $17,000 | $17,000 |
| | Sub-Total Testing | | | $51,000 |
| 108 | Medication 1 | 1 | $12,000 | $12,000 |
| 109 | Medication 2 | 1 | $12,000 | $12,000 |
| 110 | Medication 3 | 1 | $12,000 | $12,000 |
| | Sub-Total Pharmacy | | | $36,000 |
| | Total | | | $142,000 |

FIG. 8a.

EXPLANATION OF BENEFITS

Date: 01/01/2000
Identification: ABCDEFG

Patient Name: John Smith (Spouse)
Claim ID: 7891011ABC    Received: 01/01/2000 Member ID: 9101EFG
Member: Mary Jones
Group Name: ABC Co.                    Group No.: ABCDEFG123456

| Date | Code | Submitted Charges | Allowable Amount | Copay | Not Allowable | Deductible | Co Insurance | Patient Resp. | Payable |
|---|---|---|---|---|---|---|---|---|---|
| 01/01/2000 | 1011 | $200.00 | | | $180.00 | | $10.00 | $5.00 | $5.00 |
| 01/01/2000 | 1012 | $25.00 | | | $20.00 | | | | $20.00 |
| 01/01/2000 | 1013 | $35.00 | | | $30.00 | | | | $30.00 |
| Totals | | $260.00 | | | $230.00 | | $10.00 | $5.00 | $55.00 |

Remarks:

Total Patient Responsibility: $5.00
Claim Payment: $0.00

Patient Name: Mary Jones (Self)
Claim ID: 123456ABC    Received: 01/01/2000 Member ID: 6789EFG
Member: Mary Jones
Group Name: ABC Co.                    Group No.: ABCDEFG123456

| Date | Code | Submitted Charges | Allowable Amount | Copay | Not Allowable | Deductible | Co Insurance | Patient Resp. | Payable |
|---|---|---|---|---|---|---|---|---|---|
| 01/01/2000 | 1234 | $100.00 | | | $90.00 | | $5.00 | $2.00 | $3.00 |
| 01/01/2000 | 5678 | $15.00 | | | $10.00 | | | | $10.00 |
| 01/01/2000 | 9101 | $15.00 | | | $10.00 | | | | $10.00 |
| Totals | | $130.00 | | | $110.00 | | $5.00 | $2.00 | $23.00 |

Remarks:

Total Patient Responsibility: $2.00
Claim Payment: $0.00

FIG. 8b.

GENERAL HOSPITAL
123 MAIN STREET
ANYTOWN, STATE 11111

Name: Mary Jones  Plan:
Address: 456 Any Street, Main Town, State 1  Date:
Telephone: (123) 456-7890

| Patient No.: | 123456 | Admitted | Released | | | |
|---|---|---|---|---|---|---|
| Outpatient | | 01/01/2000 | 01/01/2000 | | | |
| Code | Description | Date | Code | Amount | Unit | Total |
| Procedure ABC | | | | | | $100,000 |
| 13 | Radiology | | | | | $100,000 |
| ABC101 | Fluoroscopy | 01/01/2000 | ABC201 | $50,000 | 1 | $50,000 |
| ABC102 | Radiography | 01/01/2000 | ABC201 | $50,000 | 1 | $50,000 |
| Procedure EFG | | | | | | $200,000 |
| 13 | Orthopedics and Trauma | | | | | |
| EFG101 | Procedures: | 01/01/2000 | EFG201 | $200,000 | 1 | $200,000 |
| | Procedure 1 | | | $50,000 | 1 | |
| | Procedure 2 | | | $35,000 | 1 | |
| | Procedure 3 | | | $45,000 | 1 | |
| | Procedure 4 | | | $70,000 | 1 | |
| Medications | | | | | | $50,000 |
| 425 | Medications | | | | | $25,000 |
| HJK101 | Medication 1 | 01/01/2000 | HJK201 | $15,000 | 2 | $15,000 |
| HJK102 | Medication 2 | 01/01/2000 | HJK202 | $5,000 | 1 | $5,000 |
| HJK103 | Medication 3 | 01/01/2000 | HJK203 | $5,000 | 1 | $5,000 |
| 0123 | Liquid Medications | | | | | $50,000 |
| LMN101 | Medication 1 | 01/01/2000 | LMN201 | $50,000 | 1 | $50,000 |
| Devices | | | | | | |
| 1000 | Hospital Instruments | | | | | $200,000 |
| OPQ101 | Catheters | 01/01/2000 | OPQ201 | $100,000 | 3 | $100,000 |
| OPQ102 | Cannulas | 01/01/2000 | OPQ202 | $100,000 | 5 | $100,000 |

FIG. 9a.

EXPLANATION OF BENEFITS

| Patient | Jane Doe | Claim No.: | 12345678-ABC | Amount: | 6,835.00 |
|---|---|---|---|---|---|
| Date of Service: | 01/01/2000 | | | | |
| Service | | Charge | Adjustment | | |
| Code | Date | Amount | Amount | Adjustment Reason | Payable Amount |
| Claim (-) | 01/01/2000 | 0.00 | 462.41 | Reason 1 | 462.41- |
| 101 | 01/01/2000 | 850.00 | 675.00 | Reason 2 | 174.20 |
| 102 | 01/01/2000 | 75.00 | 75.00 | Reason 3 | 0.00 |
| 103 | 01/01/2000 | 60.00 | 60.00 | Reason 4 | 0.00 |
| 104 | 01/01/2000 | 100.00 | 100.00 | Reason 5 | 0.00 |
| 105 | 01/01/2000 | 5375.00 | 3121.00 | Reason 6 | 2253.90 |
| 106 | 01/01/2000 | 375.00 | 375.00 | Reason 7 | 0.00 |
| Total | | 6835.00 | 4869.31 | | 1965.69 |
| Total of Prior Payments | | | | | 0.00 |
| Total Payable | | | | | 1965.69 |
| Patient | John Doe | Claim No.: | 10987654-EFG | Amount: | 8,250.00 |
| Date of Service: | 01/02/2000 | | | | |
| Service | | Charge | Adjustment | | |
| Code | Date | Amount | Amount | Adjustment Reason | Payable Amount |
| Claim (-) | 01/02/2000 | 0.00 | 0.00 | | 0.00 |
| 201 | 01/02/2000 | 8250.00 | 4743.20 | Reason A | 3506.80 |
| | | | 50.00 | Reason B | 50.00- |
| Total | | 8250.00 | 4793.20 | | 3456.80 |
| Total of Prior Payments | | | | | 0.00 |
| Total Payable | | | | | 3456.80 |

FIG. 9h.

| Transaction | | | | | | | | | | | | | | |
|---|---|---|---|---|---|---|---|---|---|---|---|---|---|---|
| Payor | Payee | Claim | | | | | | | | | | | | |
| | | Id | Insured | Claim | | | | | | | | | | |
| | | | Patient | Service | Charged | Paid | PatientResponsability | Status | | | | | | |
| | | 12345678-ABC | | | | | | | | | | | | |
| | | | | Service | | | | | | | | | | |
| | | | | BegDate | EndDate | Quantity | Code | Charged | Paid | Deductions | | | | |
| | | | | | | | | | | Deduct1 | | Deduct2 | | Deduct3 |
| | | | | | | | | | | Amount | Reason | Amount | Reason | |
| | | | | 01/01/2000 | 01/01/2000 | | Claim- | | | | | | | |
| | | | | 01/01/2000 | 01/01/2000 | | 111 | | | | | | | |
| | | | | 01/01/2000 | 01/01/2000 | | 102 | | | | | | | |
| | | | | 01/01/2000 | 01/01/2000 | | 103 | | | | | | | |
| | | | | 01/01/2000 | 01/01/2000 | | 104 | | | | | | | |
| | | | | 01/01/2000 | 01/01/2000 | | 105 | | | | | | | |
| | | | | | | | 106 | | | | | | | |

FIG. 9i.

| Transaction | | |
|---|---|---|
| Payor | Payee | Claim |

| Claim | | | | | |
|---|---|---|---|---|---|
| Patient | Insured | Service | Charged | Paid | PatientResponsability | Status |
| Id | | | | | | |
| 12345678-ABC | | | | | | |

| Service | | | | | | | | | | |
|---|---|---|---|---|---|---|---|---|---|---|
| BegDate | EndDate | Quantity | Code | Charged | Paid | Deductions | | | | Paid |
| | | | | | | Deduct1 | | Deduct2 | | Deduct3 |
| | | | | | | Amount | Reason | Amount | Reason | |
| 01/01/2000 | 01/01/2000 | | Claim-111 | | | | | | | |
| 01/01/2000 | 01/01/2000 | | 102 | | | | | | | |
| 01/01/2000 | 01/01/2000 | | 103 | | | | | | | |
| 01/01/2000 | 01/01/2000 | | 104 | | | | | | | |
| 01/01/2000 | 01/01/2000 | | 105 | | | | | | | |
| 01/01/2000 | 01/01/2000 | | 106 | | | | | | | |

| Transaction | | | | | | | |
|---|---|---|---|---|---|---|---|
| Payor | Payee | Claim | | | | | |
| | | Claim | | | | | |
| | | Id | Patient | Insured | Service | Charged | Paid | PatientResponsability | Status |
| | | 12345678-ABC | | | | 6835 | 6835 | | |

| Service | | | | | | | |
|---|---|---|---|---|---|---|---|
| BegDate | EndDate | Quantity | Code | Charged | Paid | Deductions | |
| | | | | | | Deduct1 | Deduct2 | Deduct3 |
| | | | | | | Amount | Reason | Amount | Reason | Amount | Reason |
| 01/01/2000 | 01/01/2000 | | Claim- | 0 | 0 | | | | | | |
| 01/01/2000 | 01/01/2000 | | 101 | 850 | 850 | | | | | | |
| 01/01/2000 | 01/01/2000 | | 102 | 75 | 75 | | | | | | |
| 01/01/2000 | 01/01/2000 | | 103 | 60 | 60 | | | | | | |
| 01/01/2000 | 01/01/2000 | | 104 | 100 | 100 | | | | | | |
| 01/01/2000 | 01/01/2000 | | 105 | 5375 | 5375 | | | | | | |
| 01/01/2000 | 01/01/2000 | | 106 | 375 | 375 | | | | | | |
| | | | | 6835 | 6835 | | | | | | |

FIG. 9m.

| Transaction | | |
|---|---|---|
| Payor | Payee | Claim |

| Claim | | | | |
|---|---|---|---|---|
| Id | Patient | Insured | Service | Charged | Paid | PatientResponsability | Status |

| Id | Patient | Insured | Service | Charged | Paid | PatientResponsability | Status |
|---|---|---|---|---|---|---|---|
| 12345678-ABC | | | | 6835 | 1965,69 | | |

| Service | | | | | | | | | |
|---|---|---|---|---|---|---|---|---|---|
| BegDate | EndDate | Quantity | Code | Charged | Paid | Deductions | | | |
| | | | | | | Deduct1 | Deduct2 | Deduct3 | Paid |
| | | | | | | Amount | Reason | Amount | Reason | Amount | Reason | |

| BegDate | EndDate | Quantity | Code | Charged | Deduct1 Amount | Deduct1 Reason | Deduct2 Amount | Deduct2 Reason | Deduct3 | Paid |
|---|---|---|---|---|---|---|---|---|---|---|
| 01/01/2000 | 01/01/2000 | | Claim- | 0 | | | | | 462,41 | -462,41 |
| 01/01/2000 | 01/01/2000 | | 101 | 850 | | | | | 675,8 | 174,2 |
| 01/01/2000 | 01/01/2000 | | 102 | 75 | | | | | 75 | 0 |
| 01/01/2000 | 01/01/2000 | | 103 | 60 | | | | | 60 | 0 |
| 01/01/2000 | 01/01/2000 | | 104 | 100 | | | | | 100 | 0 |
| 01/01/2000 | 01/01/2000 | | 105 | 5375 | | | | | 3121,1 | 2253,9 |
| 01/01/2000 | 01/01/2000 | | 106 | 375 | | | | | 375 | 0 |
| | | | | 6835 | | | | | | 1965,69 |

FIG. 9p.

| Transaction | | | | | | | | | | | | | | | |
|---|---|---|---|---|---|---|---|---|---|---|---|---|---|---|---|
| Payor | Payee | Claim | | | | | | | | | | | | | |
| | | Claim | | | | | | | | | | | | | |
| | | Id | Patient | Insured | Service | Charged | Paid | PatientResponsability | Status | | | | | | |
| | | 12345678-ABC | | | | 6835 | 1965,69 | | | | | | | | |
| | | 10987654-EFG | | | | 8250 | 3506,8 | | | | | | | | |
| | | | | | | | | Service | | | | | | | |
| | | | | | | | | | | | | Deductions | | | |
| | | | | | | | | | | | | Deduct1 | Deduct2 | Deduct3 | |
| BegDate | EndDate | Quantity | Code | Charged | Amount | Reason | Amount | Reason | Amount | Reason | Paid |
| 01/02/2000 | 01/02/2000 | | Claim-201 | 0 | | | | | | 0 | 0 |
| 01/02/2000 | 01/02/2000 | | 201 | 8250 | | | | | | 4743,2 | 3506,8 |
| | | | | 8250 | | | | | | 4743,2 | 3506,8 |

FIG. 9q.

| Transaction | | | | | | | | |
|---|---|---|---|---|---|---|---|---|
| Payor | Payee | Claim | | | | | | |
| | | Claim | | | | | | |
| | | Patient | Insured | Service | Charged | Paid | PatientResponsability | Status |
| | | 12345678-ABC | | | 6835 | 1965,69 | | |
| | | 10987654-EFG | | | 8250 | 3456,8 | | |

| Service | | | | | | Deductions | | | | | |
|---|---|---|---|---|---|---|---|---|---|---|---|
| | | | | | | Deduct1 | | Deduct2 | | Deduct3 | |
| BegDate | EndDate | Quantity | Code | Charged | Amount | Reason | Amount | Reason | | Paid |
| 01/02/2000 | 01/02/2000 | | Claim-201 | 0 | | | | | 0 | 0 |
| 01/02/2000 | 01/02/2000 | | 201 | 8250 | | | | | 4743,2 | 3506,8 |
| | | | | | | | | | 50 | -50 |
| | | | | 8250 | | | | | 4793,2 | 3456,8 |

FIG. 10a.

EXPLANATION OF BENEFITS

Patient Name: Mary Jones
Claim ID: 123456ABC    Received: 01/01/2000

| Procedure Number | Units of Service | Date of Service From | Date of Service To | Billed Amount | Amount Allowed | Amount Not Allowed | Deductible | CoPayment | Amount Paid |
|---|---|---|---|---|---|---|---|---|---|
| A101 | 30 | 01/01/2000 | 01/01/2000 | 4500.00 | 1721.07 | 2778.93/01 1376.86/02 | 0.00 | 0.00 | 344.21 |
| A102 | 01 | 01/01/2000 | 01/01/2000 | 375.00 | 168.78 | 206.22/01 135.02/02 | 0.00 | 0.00 | 33.76 |
| A103 | 02 | 01/01/2000 | 01/01/2000 | 40.00 | 0.56 | 39.44/01 0.45/02 | 0.00 | 0.00 | 0.51 |
| Totals | | | | 4915.00 | 1890.41 | 4536.92 | 0.00 | 0.00 | 378.08 |

FIG. 10b.

| Transaction | | |
|---|---|---|
| Payor | Payee | Claim |

| Claim | | | | | |
|---|---|---|---|---|---|
| Id | Patient | Insured | Service | Charged | Paid | PatientResponsability | Status |
| 123456ABC | | | | 4915 | 4915 | | |

| Service | | | | | | Deductions | | | | | |
|---|---|---|---|---|---|---|---|---|---|---|---|
| BegDate | EndDate | Quantity | Code | Charged | Amount | Deduct1 | | Deduct2 | | Deduct3 | Paid |
| | | | | | | Reason | Amount | Reason | Amount | Reason | |
| 01/01/2000 | 01/01/2000 | 30 | A101 | 4500 | | | | | | | 4500 |
| 01/01/2000 | 01/01/2000 | 1 | A102 | 375 | | | | | | | 375 |
| 01/01/2000 | 01/01/2000 | 2 | A103 | 40 | | | | | | | 40 |
| | | | | 4915 | | | | | | | 4915 |

FIG. 10c.

| Transaction | | |
|---|---|---|
| Payor | Payee | Claim |

| Claim | | | | | |
|---|---|---|---|---|---|
| Id | Patient | Insured | Service | Charged | Paid | PatientResponsability | Status |
| 123456ABC | | | | 4915 | 417.97 | | |

| Service | | | | | | | | | | |
|---|---|---|---|---|---|---|---|---|---|---|
| BegDate | EndDate | Quantity | Code | Charged | Amount | Deductions | | | | Paid |
| | | | | | | Deduct1 | | Deduct2 | Deduct3 | |
| | | | | | | Reason | Amount | Reason | | |
| 01/01/2000 | 01/01/2000 | 30 | A101 | 4500 | 2778.93 | | | | | 344.21 |
| | | | | | 1376.86 | | | | | |
| 01/01/2000 | 01/01/2000 | 1 | A102 | 375 | 206.22 | | | | | 33.76 |
| | | | | | 135.02 | | | | | |
| 01/01/2000 | 01/01/2000 | 2 | A103 | 40 | 39.44 | | | | | 40 |
| | | | | | 0.45 | | | | | |
| | | | | 4915 | 4536.92 | | | | | 417.97 |

SYSTEM AND METHOD FOR PROCESSING OBJECTS

CROSS-REFERENCE TO RELATED APPLICATIONS

The present application claims priority to U.S. Provisional Patent Application No. 61/340,060 to Baret et al., filed Mar. 11, 2010, and entitled "System and Method for Processing Objects," the disclosure of which is incorporated herein by reference in its entirety.

TECHNICAL FIELD

In general, the present disclosure relates to image processing. Specifically, the present disclosure relates to processing documents and/or data objects by providing various location and field value information about items contained within such document and/or data objects.

BACKGROUND

There is a wide range of cases where an organization needs to populate its information system (e.g. a relational database) using the field values presented on a paper document of a given type. Paper documents may be fixed layout forms, invoices, lockbox statements, explanation-of-benefits ("EOB") documents, deeds of trust, etc. The structure of the database that is to be populated is a data model. Systems may be built that may automatically locate various fields of input document pages, recognize them and match them to items of the data model. In most cases, those systems may be able to process only a portion of the task, the remainder being performed manually by keying operators. However, in some cases, a very small portion or none of the fields may be automatically matched to their corresponding items inside the data model.

Thus, there is a need to increase the efficiency of the keying operator performing manual feeding of information system by allowing him/her to interact dynamically with the recognition engine. In this semi-automatic recognition process, the operator may perform partially the location task, while the recognition engine may perform the remainder of the location task, and the recognition task. There is further a need for a more efficient image processing and object recognition that may be capable of using partial information that may be available with regard to the document/object being processed and providing that information to the recognition engine to perform the recognition task. There is further a need for a more efficient image processing and character/object recognition that may be capable of performing recognition of handwritten characters/objects and typewritten/machine-written characters/objects alike.

SUMMARY

Some implementations of the current subject matter relate to a system for processing of objects. The system includes a processor coupled to a graphical user interface configured to display an object. The processor can be configured to receive input from a user concerning the object, wherein the input relates to at least a portion of the object. The processor can be also configured to provide the input to a keying module, wherein the keying module can be further configured to process the received input and to provide the input to a recognition engine. The recognition engine can be configured to be in communication with the keying module. Based on the received input, the recognition engine can be configured to provide exact predetermined information concerning the received input to the keying module. The keying module can be configured to generate an enhanced information about the object based on the information received from the recognition engine and predetermined information concerning the object.

Some implementations of the current subject matter relate to a computer-implemented method for processing of objects. The method includes providing a processor and a graphical user interface configured to display an object, wherein the processor is coupled to the graphical user interface. Then, the processor receives input from a user concerning the object, wherein the input relates to at least a portion of the object, and provides the input to a keying module. The keying module processes the received input and provides the input to a recognition engine, wherein the recognition engine is configured to be in communication with the keying module. The recognition engine, based on the received input, generates exact predetermined information concerning the received input to the keying module. The keying module generates an enhanced information about the object based on the information received from the recognition engine and predetermined information concerning the object.

Some implementations of the current subject matter relate to a computer program product stored on a computer-readable medium, for use with a computer configured to process documents. The computer program product comprising computer-readable instructions for causing the computer to: display an object on a graphical user interface; receive input from a user concerning the object, wherein the input relates to at least a portion of the object; provide the input to a keying module. Then, using the keying module, the received input is processed and provided to a recognition engine, wherein the recognition engine is configured to be in communication with the keying module. Using the recognition engine, based on the received input, exact predetermined information concerning the received input to the keying module is generated. Using the keying module, enhanced information about the object based on the information received from the recognition engine and predetermined information concerning the object is then generated.

Further features and advantages of the invention, as well as structure and operation of various implementations of the invention, are disclosed in detail below with references to the accompanying drawings.

BRIEF DESCRIPTION OF THE FIGURES

Some implementations of the current subject are described with reference to the accompanying drawings. In the drawings, like reference numbers indicate identical or functionally similar elements. Additionally, where possible, the left-most digit(s) of a reference number identifies the drawing in which the reference number first appears.

FIG. 3 illustrates an exemplary explanation of benefits document that can be processed by the system shown in FIG. 1.

FIG. 5 illustrates an exemplary data grid that can be used in connection with the system shown in FIG. 1 for processing documents, according to some implementations of the current subject matter.

FIGS. 6, 7, and 8*a-b* illustrate exemplary documents that can be processed by the system shown in FIG. 1.

FIGS. 9*a-q* and 10*a-c* illustrate an exemplary processing of an explanation of benefits document, according to some implementations of the current subject matter.

DETAILED DESCRIPTION

To address the above-noted and potentially other issues with currently available solutions, one or more implementations of the current subject matter provide methods, systems, articles or manufacture, and the like that can, among other possible advantages, provide systems and methods for processing of objects.

The following description provides a discussion of exemplary systems and methods for processing documents, according to some implementations of the current subject matter. Such implementations are discussed in connection with FIGS. 1-13, which are provided here for illustrative purposes only and are not intended to limit the full scope of the current subject matter.

Figure 1:
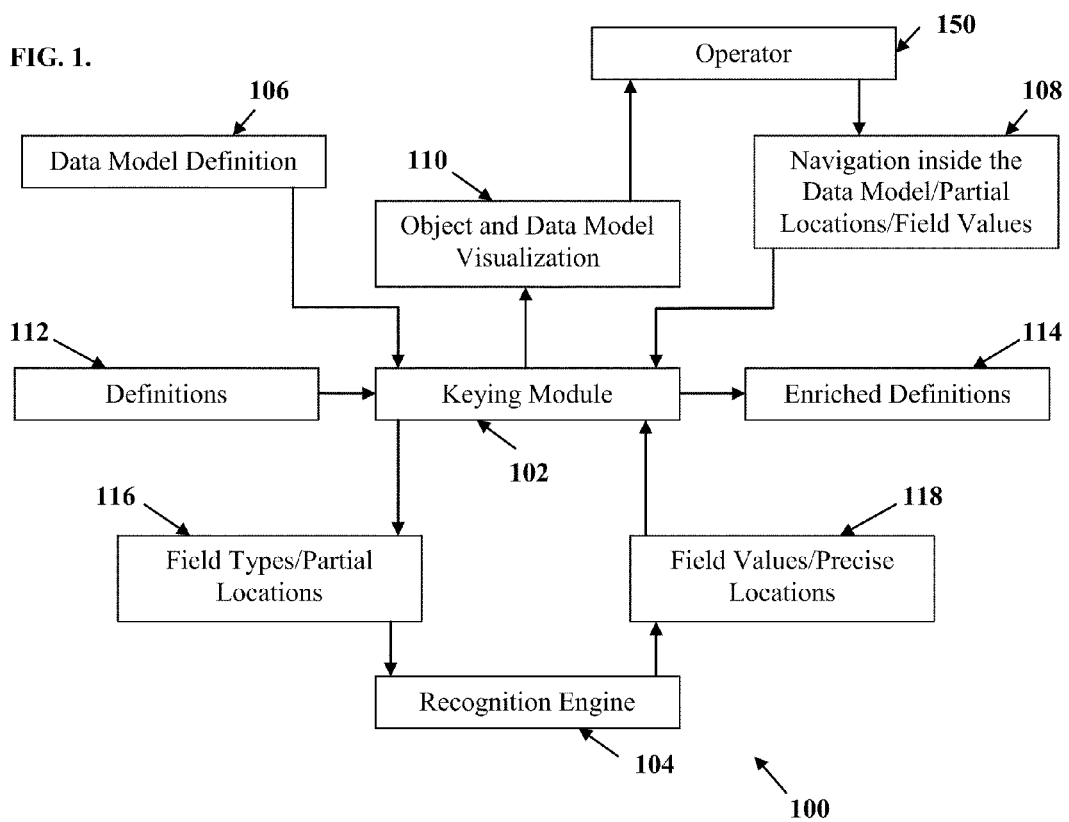
FIG. 1 illustrates an exemplary system for processing object entities using a keying module and a recognition engine, according to some implementations of the current subject matter.

FIG. 1 illustrates an exemplary system 100 for processing object entities, according to some implementations of the current subject matter. In some implementations, object entities can be documents or parts of documents, fields inside documents, or any other object entities. Further, the object entities can contain handwritten characters/objects and/or typewritten/machine-written characters/objects, wherein the system 100 can perform processing of both types of characters/objects in the same object entity and/or different object entities. As can be understood by one having ordinary skill in the art, the term "object entity" can be any data model and/or object that can be presented to an operator, whether human or a machine, for processing. This term is used for illustrative purposes and for ease of description only and is not intended to limit the scope of the current subject matter. System 100 can be implemented on a personal computer, a mobile telephone, iPod, iPad, iPhone, a smartphone, a BLACKBERRY® device, a laptop, or any other suitable device.

Figure 2:
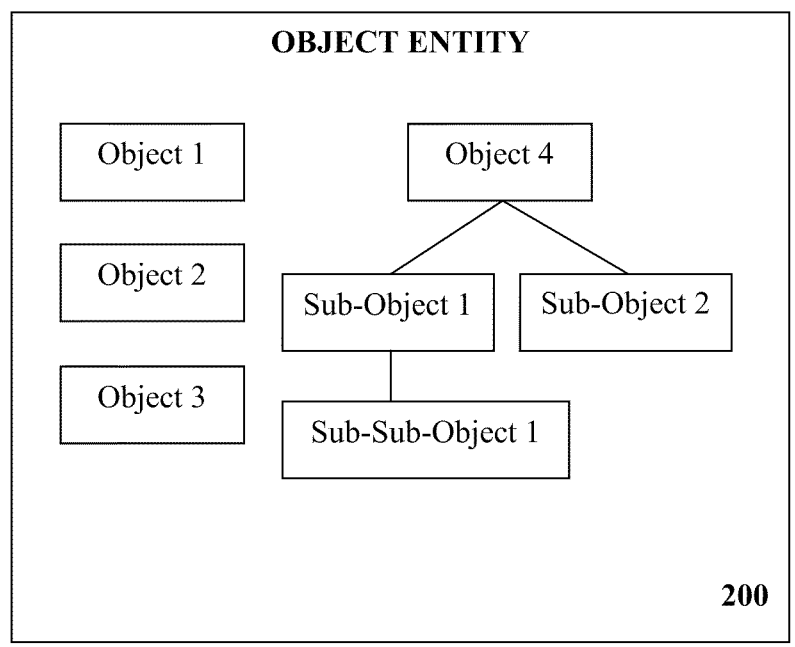
FIG. 2 illustrates an exemplary object entity that can be processed by a system shown in FIG. 1, according to some implementations of the current subject matter.

FIG. 2 is a block diagram of an exemplary object entity 200 that includes various objects. Some objects can be stand alone objects, e.g., "Object 1", "Object 2", "Object 3", while other objects can include various sub-objects and sub-sub-objects, e.g., "Object 4" can include "Sub-Object 1" and "Sub-Object 2", where "Sub-Object 1" can include a "Sub-sub-Object 1." By way of an example, an object entity 200 can be a document containing "Explanation of Benefits" ("EOB") statement information for a patient's visit to a hospital, a doctor, or any other medical facility. An object within the "Explanation of Benefits" statement can include a patient's name, a doctor's name, a insurance card holder's (or member) name, group name, group number, type of health insurance plan, an explanation of services rendered, dates on which services were rendered, amount owed, amount paid, amount outstanding, insurance carrier, etc. An exemplary explanation of benefits document is shown in FIG. 3. The EOB statement, shown in FIG. 3, includes a table, which contains information about the services rendered, costs, payments, co-insurance information, patient payment responsibility, amount payable, etc. Each entry in the table as well as any other information on the EOB statement can be an object within the object entity. The system 100 can be configured to process any type of objects, including, but not limited to, documents in various document formats (e.g., .PDF, .TIFF, .JPEG, .GIF, .DOC, .XLS, .PPT, etc.), multimedia objects in various formats (e.g., .MPEG, XML, JAVA, .WAV, etc.) or any other types of objects. The following description refers to the term "document" for ease of illustration and discussion only and is not intended to limit the disclosure of the present application. As stated above, the characters/objects contained within such "document" can be handwritten and/or typewritten/machine-written, whereby handwritten refers to characters/objects created by a human hand (e.g., handwriting using a pen, a pencil, etc.) and typewritten/machine-written characters/objects refers to characters/objects created using a typewriter, a computer-and-printer system, a printer, or any other mechanical and/or electro-mechanical system capable of outputting typed characters/objects.

In some implementations, system 100 can include a keying module 102 that is communicatively coupled to a recognition engine 104. In some implementations, the keying module 102 and the recognition engine 104 can be disposed within a single device or can be part of separate devices. The module 102 and the engine 104 can be coupled via any wired, wireline, wireless connection, a two way pager network, cellular telephone network, wireless mobile radio network, Wi-Fi network, wide area network ("WAN"), metropolitan area network ("MAN"), local area network ("LAN"), or any other suitable connection.

The system 100 can include an operator 150 that can provide various instructions to the keying module 102 for the purposes of processing object entities, including recognition of various objects that may be contained within such object entities, whereby objects can be handwritten and/or typewritten/machine-written. The operator can be a human, a machine, or any user of the system 100. In some implementations, the system 100 can automatically process object entities without involvement of the operator 150. In alternate implementations, the operator 150 can interact with the recognition engine 104 to accelerate recognition of object entities and/or various objects within object entities. The operator 150 can provide instructions via various operator interface(s), which can include, but are not limited to, a monitor, a keyboard, a mouse, a touch pad, a touch screen, a remote control, a signal generator, and/or any other means for interacting with the system 100.

In some implementations, the keying module 102 can be configured to receive various input information, including but not limited to, data, object definitions, data model definitions, operator input, and/or any other input concerning a particular object entity and/or its objects. Based on the input, the keying module 102 can be configured to generate information concerning the document (including partial locations of object(s) within the document) for processing by the recognition engine 104. Based on the supplied information, the recognition engine 104 can be configured to generate a more detailed and/or more precise information (e.g., exact locations, field values, etc. of objects within the document) concerning an object and provide that information to the keying module 102 so that the keying module 102 can generate more precise definitions of object(s) within the document. In some implementations, a more detailed and/or precise information concerning objects within the document can be useful to the operator 150 that can be navigating within an object (e.g., a document) and providing imprecise or inexact information concerning an object within the document (e.g., using a computer mouse, the operator points to a value within a table, but does so in an imprecise manner, whereas a precise information about the value and what it represents is requested).

In some implementations, each such object within a document can be associated with various location data, field value data, tags, labels, source code, object code, graphical representations, and/or any other data. In some implementations, the operator 150 can use a mouse, a keyboard, a finger, or any other pointer to locate an object within a document. Once the operator navigated to a desired object, the data concerning such object (e.g., partial location data, field value data, etc.) can be supplied to the keying module 102. Further, the operator can use a graphical user interface ("GUI") to navigate to a particular location (e.g., the operator can move a mouse pointer on a screen to point to a specific object within a document). In some implementations, the keying module 102 can allow the operator 150 to view a list of objects and enrich those objects through entry of field values inside a pre-defined data model. The data model can be defined according to a particular object entity being processed and can provide information concerning structure, location, values, types of data, fields containing data as well as any other information can be used to process an object entity. The keying module 102 can be configured to provide the data associated with the identified object (e.g., partial location data, field values, field types, etc.) to the recognition engine 104. The recognition engine 104 can be configured to process such data and output precise location data and field values for the identified object within the object. The recognition engine 104 can then provide this data to the keying module 102, which can output enriched object definitions and provides document and data model visualization information to the operator. Such data can be displayed on the GUI. In some implementations, in order to generate enriched document definitions and provide the operator with object and data model visualization information, the keying module 102 can be configured to be provided with or loaded with document definition(s) and data model definition(s). Such definitions can be pre-loaded into the keying module 102 or generated based on the need to work with specific documents and/or data models. In some implementations, the system 100 can be configured to automatically obtain a specific data model and/or document definition(s) based on the information loaded into the keying module and/or provided by the operator. In alternate implementations, data model and/or object definition(s) can be provided manually by the operator (e.g., the operator would specify such definitions prior to and/or upon navigating the document).

Data Model

Figure 4:
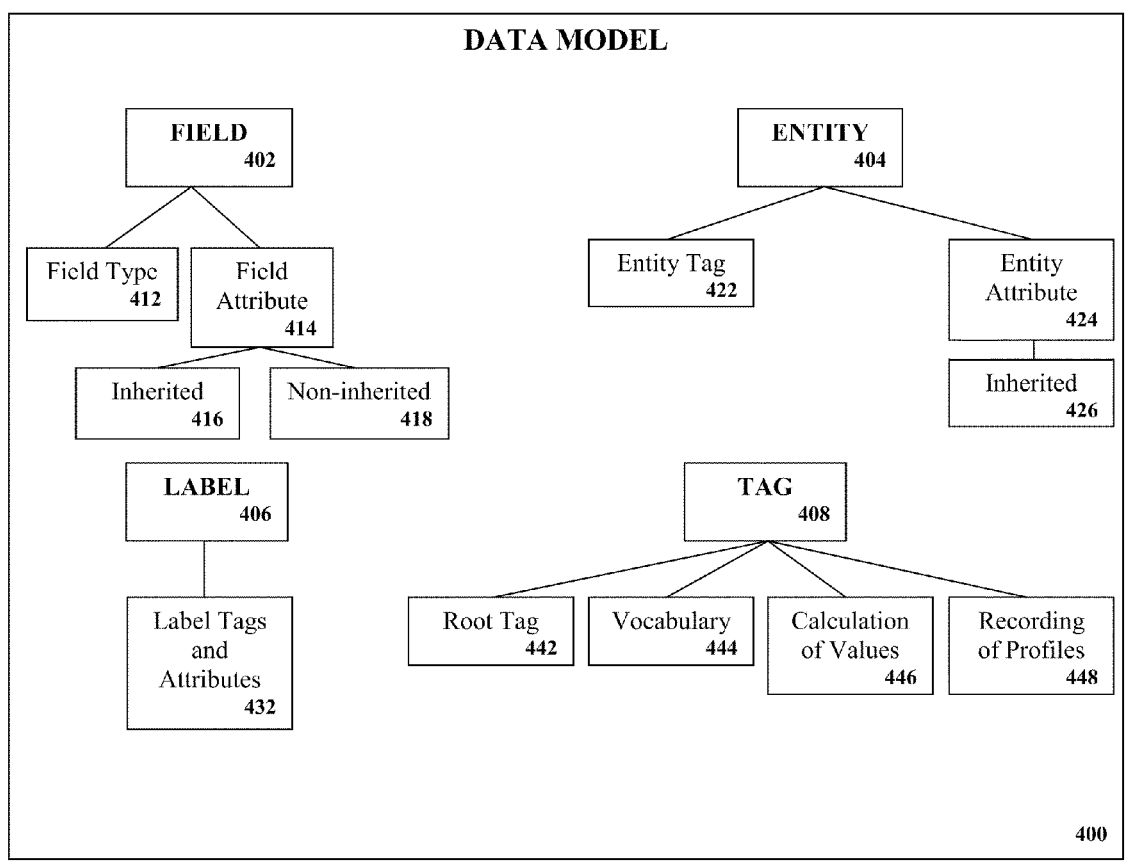
FIG. 4 is a block diagram an exemplary data model that can be used in connection with the system shown in FIG. 1 for processing object entities, according to some implementations of the current subject matter.

In some implementations, the keying module 102 can use a predetermined data model to process various documents. FIG. 4 is a block diagram of an exemplary data model 400, according to some implementations of the current subject matter. The data model 400 can be used by the keying module 102 to process documents and can include at least one field 402, at least one entity 404, at least one label 406, and at least one tag 408. In some implementations, field(s) 402 can refer to a particular location, place, setting, or any other information that can be located in the document. For example, if the object entity is an explanation of benefits document, then a field can be a name of the patient, amount owed, date of service, etc. For ease of illustration only, the following description will be presented with reference to an explanation of benefits ("EOB") document being an object entity that is to be processed by the system 100. The exemplary EOB document can include a plurality of pages, each having a multitude of information. Such document can further include objects/characters that can be handwritten, typewritten/machine-written, drawn, painted, stamped, imprinted, imbedded, or placed on or contained within the document in any other form. The system 100 can be configured to recognize any such objects/characters.

With reference to the EOB document, the field(s) 402 can include a field type 412 and a field attribute 414 (which can be inherited 416 or non-inherited 418). The fields 402 can be filled after the EOB document is processed by the system 100, or they can be located by operator 150, recognition engine 104, and/or entered by an operator 150, or recognized by the recognition engine 104. The field types can be simple fields, name fields, address related fields, or any other types of fields, as illustrated for the EOB document by TABLE 1 below. In some implementations, the field types can be predetermined and/or organized into various hierarchies. As can be understood by one having ordinary skill in the relevant art, the current subject matter is not limited to the field types shown in TABLE 1.

TABLE 1

FIELD TYPES.

| Simple Field Types | Name Field Types | Address-related Field Types |
|---|---|---|
| FieldAlpha | FieldFirstName | FieldAddress |
| FieldAmount | FieldLastName | FieldCity |
| FieldCheckBox | FieldMiddleInitial | FieldCityZip |
| FieldDate | FieldName | FieldDestination |
| FieldNumeric | | FieldHouseNumber |
| FieldPercent | | FieldNameAndAddress |
| FieldPhoneNumber | | FieldShortZip |
| FieldSocialSecurityNumber | | FieldState |
| FieldText | | FieldStreet |

In addition to the field type, each field in the EOB document can include a field attribute 414. A field attribute 414 can specify some aspects of or otherwise characterize information located in a particular field. Attributes 414 can be inherited 416 and non-inherited 418. Inherited attributes 416 can include field attributes from their parent fields or entities while the non-inherited attributes 418 do not include field attributes from their parent fields or entities. For an exemplary EOB document, the non-inherited attributes 418 can include the following attributes: a "Class" attribute, an "IsHidden" attribute, a "Value" attribute, a "Vocabulary" attribute, an "IsExported" attribute, a "NameType" attribute, a "HasTotals" attribute, a "Range" attribute, a "Format" attribute, and/or any other attributes. Each of these attributes can provide various information concerning fields in the document as well as be associated with at least one specific field illustrated above. For example, the "Class" attribute can provide a name to a particular field, have a default value of a field type, and be associated with a FieldText simple field type, whose tag's default value for the Class attribute will be "Text." The "IsHidden" attribute can have a default value of "false" (i.e., a particular field is not hidden from view), but can be used for hidden variables, fields, or any other information that needs to be excluded from view. The "Value" attribute can specify a particular value for a field type identified above. The "Value"

attribute can be predetermined for a particular field type and can be used to initialize variables associated with field types. The "Vocabulary" attribute can specify a predetermined vocabulary for a particular field type. The "IsExported" attribute can prevent a variable from being shown in the resulting document that has been processed by the system 100. The "NameType" attribute can be configured to separate name fields into company and person names. The "HasTotals" attribute can be configured to calculate and display total values for predetermined fields (e.g., this attribute can be used to calculate total for all amounts owed that are located in the appropriate fields throughout the entire document). The "Range" attribute can have a "Word/Line/Paragraph" value and can be used to determine particular fields for the recognition engine 104 to search for. In some implementations, the "Range" attribute can be used in connection with the following field types: FieldAlpha, FieldNumeric, and FieldText. The "Format" attribute can be configured to define an expected format for a particular field type (e.g., FieldAlpha, FieldNumeric, FieldText, etc.). As can be understood by one having ordinary skill in the relevant art, the above discussion was provided for exemplary purposes only and is not intended to limit the current subject matter to the above-discussed field attributes.

In some implementations, the inherited field attributes 416 can "inherit" their parent field attributes and/or entity tags. As such, the inherited field attributes 416 can be configured to assume values of their parent field attributes. If there is no parent field attribute, then a default value can be predetermined for that field attribute. In some implementations, for an EOB document, the inherited field attributes can include a "WriteType" attribute, a "Country" attribute, an "IsExported" attribute, and/or any other attributes. The "WriteType" attribute provides a write type of the field, i.e., whether the information in that field was handwritten, typed in, printed, or otherwise auto-detected by the system generating the document. The "Country" attribute can specify a particular country and hence, the corresponding language (e.g., French, English, German, Spanish, etc.). As can be understood by one having ordinary skill in the relevant art, other inherited attributes are possible.

The data model 400's entities 404 can be configured to group various fields 402. For example, in the EOB document, an entity "Person" can group the following fields: "Name", "Address", and "Social Security Number". In exemplary embodiments, entities 404 can be grouped into hierarchies, whereby one entity can be a parent to child entities and/or fields and where child entities can have its own child entities and/or fields. In some implementations, the entities can also include attributes, where some attributes can be inherited from parent entities. In an example of the EOB document, entity attributes can include: "class" attribute that can provide a name of a particular entity; "HasHidden" attribute that can indicate whether entity and/or its fields are to be displayed or not; "HasMultipleOccurrences" attribute that can indicate whether the entity includes one or multiple occurrences; "IsArray" attribute that can indicate whether the recognition engine 104 can locate information about a particular entity in an array and attempt to determine the value(s) located in at least one field for all occurrences of a particular entity (if "HasMultipleOccurrences" is set to false indicating a single entity occurrence, then this attribute can be ignored). As stated above, some attributes can be inherited from the parent entities. These can include "IsExported" (whether or not a particular entity and its fields are to be inserted into a resulting document), "Country" (indicating that a parent entity's country is its child's entity's country), and others. As can be understood by one having ordinary skill in the relevant art, other attributes are possible.

In some implementations, the data model 400 also can include labels 406 that can assist the recognition engine 104 in determining a value for a particular field. The labels 406 can be used when a particular data model 400 can be configured to define generic fields and request recognition to retrieve the value of a field and its "title". In some implementations, labels 406 can be associated with fields 402, whereby labels 406 can designate label or column header associated with simple fields or columns of data and entities, and entities 404, whereby labels can designate titles of whole entities (e.g., groups of columns, or sections inside documents). Labels 406 can be characterized by label tags and attributes 432. These can provide additional properties concerning labels of fields or entities or alternatively, can provide additional clues to the recognition engine 104 in determining what a particular field contains. In an example of an EOB document, the label tags and attributes 432 can include "Value" that can provide a default value for the label, "Vocabulary" that can provide a set of alternate values for the label, "IsExported" that can determine whether the label value is to be exported, "Format" that can indicate whether the label is to follow a regular expression, and others.

As stated above, the data model 400 can also include tags 408, which can be characterized by root tag(s) 442, vocabulary tag(s) 444, calculation of values tag(s) 446, recording of profiles tag(s) 448, and others. The root tag(s) 442 can be a unique root for the entire data model and can include various attributes in accordance with a particular object. In an example of an EOB document, such attributes can be "Class" that can provide a name of the data model, "Country" that can provide a default value of the country, "WriteType" that can indicate a default value of a write type, as indicated by the field attributes 414, and others. The vocabulary tag 444 can define a vocabulary that can restrict a number of possible values for a given fields. Vocabulary tag 444 can be embedded inside a configuration file for the system 100 or can be provided as a text file to the system 100. Vocabulary tag 444 can be include a vocabulary characterized by a name of the vocabulary and a file containing vocabulary entries, as well as a value of the vocabulary entry. The calculation of values tag 446 can be characterized by various mathematical operations and operands that can be used during processing by the system 100. The tag 446 can be used to set values for a particular field based on available mathematical formulas, calculations, or other types of operations for that field. The recording of provides tag 448 can be used to optimize processing of complex data models having a large number of entities and fields. In some implementations, the tag 448 can assist an operator 150 in selecting entities, fields, etc. for processing of object entities by the system 100. For example, various keys on a computer keyboard can be assigned specific functions, such as selection of successive entities, fields, etc. within a document.

Navigation within an Object Entity

In some implementations, the system 100 can be configured to allow the keying operator 150 to enter values into the keying module 102 through input of partial and/or quick location information and/or indication of a particular objection within an object entity (e.g., a table cell within a document page(s)). Upon receiving such information, the keying module 102 can obtain completed location and field values information for the document and/or object(s) within the document. As stated above, the system 100 can allow the keying operator 150 to perform recognition of various objects/characters, including handwritten, typewritten/machine-written, drawn, painted, stamped, imprinted, imbedded, or placed on or contained within the document in any other form. Such different types of objects/characters can be contained within one document (having one or a plurality of pages) and/or multiple documents FIG. 1 illustrates an exemplary operation of the keying module 102, according to some implementations of the current subject matter. The process can begin with operator 150 initiating keying module 102. The keying module 102 can then pre-process various objects (e.g., pages within a document) within an object entity (e.g., a document). Once the objects have been pre-processed, information about current items (i.e., data, location, etc.) can be displayed to the operator. Using such information, the operator can navigate inside a data model and/or inside pages of a document and/or pages of different documents, as shown by 108. Every time the operator performs navigation, information concerning documents, pages, location of objects, data values, field values, etc. can be provided to the pre-processing block of the keying module 102. Further, upon display of the current items via object and data model visualization 110, the keying module 102 can be configured to indicate a location of the current item, correct location (i.e., indicate a correct location of an object upon operator's pointing to a partial or approximate location of an object), and provide key data, including updated field values and/or location values. Upon determining location of current items and their location, the location and recognition fields can be generated. Then, along with key data, information about location/recognition fields can be used to update other fields within the document (e.g., totals, formulas, etc.). Then, the updated information can be displayed to the operator 150. The keying module 102 can be provided with data model definitions 106 as well as other definitions 112. Using partial location information, field types, and other information 116, which can be provided by the operator 150 during navigation inside the data model 105, the recognition engine 104 can output precise location information and field values 118 and provide them to the keying module 102. Based on that, the keying module can output enriched object entity definitions 114. The operator 150 can be called on to confirm generated location and value information.

The operator can change current document and pages. The operator can then navigate inside a data model in order to select an item to be entered, indicate a location for the current item, correct location information when necessary, and enter field value information when necessary.

The recognition engine 104 can be configured to pre-process pages of a document and/or pages of documents. Such pre-processing can be done in order to correct orientation of the page(s) within document(s). The recognition engine 104 can be also configured to process requests containing field types and location indication information and, in response, return completed location information in the form of field values and/or field value information.

The keying module 102 can be configured to populate data trees for a list of objects (e.g., documents), which can be determined by a data model that can be preloaded into the keying module 102, as discussed in connection with FIG. 4 above. The data model can define several root entities to allow keying of alternate document types corresponding to alternate possible data trees. The keying module 102 can then select a first root entity of the data model. As such, the data tree associated with the object entity can be a root node corresponding to the first root entity of the data model.

The system 100 can be configured to include a grid feature that allows selection of specific elements of the data tree, providing of a context to the recognition engine 104, when block location and/or recognition is requested and displaying location information associated with the item in the data tree. The grid feature can be also configured to enter values for elements of the data tree. The grid feature can also display information inside the data model that can be associated with a particular session of the keying module 102 with regard to the document displayed. The term "session" can refer to any processing of any object entity being performed by the system 100. The grid feature can also show values of one of the data model's root entities in the document being displayed. These values can be organized inside a tree of objects, the document being the root object. For example, in the EOB data model, the object document.Transaction.Claim[2].Service[0].Paid can be a paid field (identified as "Paid") of a first service occurrence ("Service[0]") of a third claim ("Claim[2]") occurrence of a transaction ("Transaction"), for the displayed document ("document").

The data grid can include at least one data grid cell, as shown in FIG. 5. The data grid cells can include, but are not limited to an entity name cell, a field name cell, a simple value cell, a collapsed cell, a new occurrence cell, and a total value cell. The entity name cell can include information about name of the entity as given by the data model and/or title of the entity (paragraph or section) as read for the document being processed by the system 100. The field name cell can include information about a name of the field as given by the data model and/or title of the field and/or a column to which the field belongs as read for the document. The simple value cell can include information about simple field values and/or value of one particular occurrence of a field inside a multi-occurrence entity. The collapsed cell can represent another zone of display inside the data grid. The new occurrence cell can be designed to create a new occurrence inside a multiple occurrence entity. The total value cell can include the information about total(s) or subtotal(s) values of some fields within arrays.

The cell can be displayed inside at least one or a plurality of display areas. A display area can be associated with a root object, which can be one or more nodes of a data tree for the document being processed, and a root entity or field, which can correspond to the root data tree node. The display areas can be ordered from top to bottom. The top portion of the display area includes a root display area that can be configured to display children entities and fields of a selected root entity of the data model for the document being processed. The bottom portion of the display area can include data associated with at least one collapsed cell of a previous display area.

The display area can further include a header part and a value part. The header part can display the entity/field names of the root entity/field and its children and can also reflect their hierarchy. The value part can display collapsed cells as well as simple field values, new occurrence cells and total cells.

Further, the data grid cells can further include various special cells. Special cells can include a current cell and a selected cell. The current cell can be unique for the entire data grid and can be used for entry of data. In some implementations, the current cell can be included in the bottom portion of the display area of the data grid. The selected cell can specify which box is displayed on the page. Several selected cells can be included in the bottom portion of the display area. In some implementations, one selected cell can be configured to indicate a root object of the following display area.

In some implementations, the value part of the display area can display entities in an expanded state or in a collapsed state. In the expanded state, entities can be displayed in the same area as their parent entity. In the collapsed state, entities can be displayed inside their parent's display area as cells having different visual characteristic(s), e.g., having a gray color, or a color different from other cells, etc. When these cells become current, another display area is generated under the parent display area and one of the cells of the new display area can become current. The root object of this new display area is the object associated with the current cell. The header part of the display area can include expanded entities' header, which can also show header part of its children entities and fields and collapsed entities header, which can show the entity name.

The fields can be composed fields, whereby the fields can be specified with children fields. The composed fields can be displayed in a detailed state or in a synthetic state. In some implementations, initial state of a composed field can be its detailed state. For example, a data model can include a name field that can be composed of a first name and a last name. The field's value can display different information in detailed and synthetic states. In the detailed state, the values of the subfields can be displayed. The composed value might not be displayed. For example, the name field can be displayed as the value for the first name and as the value for the last name. In the synthetic state, the composed value can be displayed. For example, the name field can be displayed as the value of the first and last names. Further, the field's header can be different in each state. In the detailed state, the header part(s) of the field and its children can be displayed. In the synthetic state, only the field's name can be displayed in the header part.

The keying module 102 can further include a feature of scrolling display areas, whereby each display area can have its separate scrolling feature and allow scrolling of the value part while keeping the header part fixed.

The keying module 102 also can include array attributes of multiple occurrence entities that can specify that an entity is expected to be represented on the document pages as an array. If the document pages can be represented as an array, then the root entity of a display area can be an array and define a multi-level array that can be recursively composed of all of its expanded children entities. Arrays can be displayed with their column labels and total lines.

The keying module 102 can be configured to include a default initial layout that can be used when a data grid is initially displayed. Such layout can be defined by all entities being expanded, all fields can be displayed in their detailed state, all children entities are collapsed that are within entities not belonging to an array, and/or all children entities are expanded that are within entities belonging to an array.

When displaying an entity inside the data grid, the cells containing entity's header and entity content can be generated. The entity or field header can be composed of the entity or field name and if the entity is in an expanded state, then for each of the entity's children the entity or field header can be displayed from left to right. In some implementations, an entity content can be displayed for each of the entity occurrences and if the entity has multiple occurrences (e.g., MultipleOccurrences="True"), the system can be configured to display an empty line. Further, if the entity is the root entity of an array, then a total line can be displayed.

In some implementations, entity occurrence content can be displayed if the entity is in a collapsed state or if the entity is in an expanded state, then for each of its children, the content can be displayed from left to right. Further, if the child is an entity, then its entity content can be displayed; but, if the child is a field, then its field content can be displayed. The field content can be displayed if the field is in a synthetic state, in which case, a single value cell showing the composed value of the field can be displayed for each of its subfields from left to right.

In some implementations, the keying module 102 can be configured to provide an operator with at least one navigation feature for efficient processing of objects that are being displayed. Such features include but are not limited to selection of particular cells, directional navigation, selection of next and/or previous items in the object being processed, as well as validation and/or review commands. Each of these commands are discussed below in more detail. As can be understood by one having ordinary skill in the relevant art, the system 100 is not limited to the above-referenced commands and other navigation commands are possible.

Selection of particular cells can include selection of "current" cells, where such cells can be a first cell and/or a last cell. For ease of the following illustration and discussion, such commands will be referred to as "ChooseFirstValue" command (for selection of the first cell) and "ChooseLastValue" command (for selection of the last cell). In some implementations, the ChooseFirstValue command can be called when a new document is displayed, a collapsed cell is selected (e.g., using a mouse and/or pointing to a new display area), a navigation command selects a next item or an entity (e.g., "NextItem" command discussed below) and/or at any other time. This command can determine a first simple value cell as defined by the corresponding data model. If the first item of the newly shown display area is an array, then the chosen current cell is the last new occurrence cell of the first column. If the first item of the newly shown display area is not an array, then the chosen current cell is the first value cell or new occurrence cell of the first column. The ChooseLastValue command can be called when a navigation command selects a previous item or an entity (e.g., "PreviousItem" command discussed below). The selected cell can be the last value cell or new occurrence cell of the last column.

Directional navigation commands can include various commands that allow movement in various directions in the object, e.g., left, right, up, down, diagonal, etc. For ease of discussion, some of these commands referring to left, right, up, and down navigation will be referred to as "LeftMotion", "RightMotion", "UpMotion", "DownMotion". In some implementations, one way to navigate inside each of the display areas can include use of the four directional arrows. For example, when a collapsed cell is a currently selected cell, a new display area can be displayed, then the ChooseFirstValue command can be called on the root entity of that display area. The directional navigation commands can be confined to operate within a particular predetermined display area.

A cell can be made current by clicking on or otherwise selecting that particular cell. Such operation can close all children display areas and, if necessary, the display area relative to that cell can be opened, whereby ChooseFirstValue can be called.

The "NextItem" command can be configured to select next item or cell for processing. For example, this can be accomplished through the use of a "Tab" key on an operator's keyboard. As can be understood by one having ordinary skill in the relevant art, other ways to implement the "NextItem" command are possible. In some implementations, the "NextItem" command can be equivalent to a Right-Direction arrow move on an operator's keyboard. However, in case of arrays, the "NextItem" command can scan whole columns one after another, then individual values within each column. In the event of non-array multiple-occurrence entities that are not arrays, the "NextItem" command can scan all successive columns for a given row one row after the other and finishing with the row that supports new occurrence cells. Further, the "NextItem" command can be configured to allow escape to a display area and proceeding to the next display area.

In case of simple value cells and new occurrence cells of arrays, the expected sequence of selecting current cells can be as follows:
1) The last new occurrence cell of the column for the whole array can be selected first. In case of an array that contains several embedded multi-occurrence entities, the new occurrence cell of the highest level multi-occurrence entity of the whole array can be selected first.
2) Then, all successive simple value cells of the column for the whole array can be selected starting with the first simple value cell of the column for the whole array and skipping all intermediate new occurrence cell (that belong to lower level multi-occurrence entities).
3) Intermediate-level new occurrence cells are not selected. However, when NextItem command selects one of them, the next simple value cell below can be selected, and, if that is cell is not available, then cells in the next column can be selected.
4) Items (1)-(3) can be repeated for each column in the array.

For other types of cells (e.g., entity or field names, entity or field labels, subtotals, etc.), NextItem command can be similar to a RightMotion command. When the NextItem command selects a cell of the current display area which does not have any successor inside the same display area, the NextItem command can select the next display area or proceed to the next object. Depending on the original cell type within the next display area, one of the cells can be selected as a current cell. Depending on the type of the original cell, various commands can be implemented as illustrated below:
   if the original cell is a simple value or new occurrence cell, then the ChooseFirstValue command can be called;
   if the original cell is a field or entity label cell, then a leftmost or "deep-most" label cell of a header tree within a new display area can be selected;
   if the original cell is a field or entity name, then a leftmost or "deep-most" name cell within a new display area can be selected.

The "PreviousItem" command can be a reverse of the "NextItem" command.

In some implementations, the system 100 can include a validation navigation command that can validate a whole display area, and allow proceeding to the next item of the parent display area (thereby closing previously displayed areas). Additional navigation commands can include navigation to the next cell for "reviewing" purposes, navigation in a different order from the data model order, depending on the value of other fields, and any other commands.

Editing of Data within Processed Object Entity

In some implementations, the keying module 102 can be configured to allow editing or otherwise changing data contained within the data grid. Such editing can include but is not limited to entering of data, deleting and/or inserting cells inside multiple occurrence entities, as well as other editing options.

Entry of data in the data grid can depend on a current cell. For example, if the current cell is an entity or field name, then a label for all cells covered by this label can be entered. If the current cell is a field value, then the field value can be entered.

If the current cell is a collapsed cell, then entry of data can be prevent because no collapsed cell may be current, as it can trigger display of a new display area, thus, becoming a selected cell. If the current cell is a total value, then entry of data can be prevented as the total value can be protected from editing.

Upon initiating of an entry of a field value, the keying module 102 can be configured to enter into a "Cell Edit" mode, where navigation can proceed from character to character instead from cell to cell. As can be understood by one having ordinary skill in the art, various commands can be predetermined to enter and exit the "Cell Edit" mode.

As soon as a cell becomes a simple value part of a multiple occurrence entity, it can be possible to delete that cell, or insert another cell before that cell. In some implementations, insert and/or delete commands can be configured to act inside one row. In alternate implementations, a global row insert and/or delete command can be disabled, whereas other columns are not modified by such commands. In some implementations, insert and/or delete commands can act on the next level multiple occurrence entity. They do not have any action on higher level multiple occurrence entities. For example, in case of EOB object, "Service" can be a multiple occurrence entity, and "Service.Deductions.Deduct1" can also be a multiple occurrence entity. A delete or insert command on a cell belonging to an occurrence of "Service.Deductions.Deduct1" (e.g., "Amount" or "Reason"), can act within the scope of "Service.Deductions.Deduct1", but not "Service". When inserting a cell before a current cell, all cell values and boxes including the current cell can be shifted one row down. When the last occurrence cell is not empty, a new row can be added to the next level multi occurrence entity. When deleting a current cell, all values and boxes below that cell can be shifted one row up. The last simple value cell, which is not the new occurrence cell, of the column can be set to empty. If, as a result of delete commands, the last row of simple values becomes composed of empty cells only, then the row can be deleted.

The keying module 102 can be further configured to perform selection of cells and/or displaying of boxes. A current cell can be configured to define a cell where data can be entered, while the current and selected cells of the lowest level display area can define which box and page are to be displayed.

Some multiple occurrence entities can be marked within a data model as arrays. This means that the associated information can be expected to be found inside arrays on document pages. As can be understood by one having ordinary skill in the relevant art, a multiple occurrence entity is not necessarily an array (e.g., "claims" portion of an EOB document). Arrays can be displayed in a specific manner. Multiple occurrence arrays and non-arrays are different for at least the following reasons. In some implementations, totals/subtotals lines can be displayed for arrays, but not for non arrays. Further, an array characterization can be inherited by all the expanded children items of its root entity inside the same display area. This means that all expanded cells, which are the children of a multiple occurrence entity having an array type, can be presumed to be part of an array, unless they are collapsed. When collapsed, a multi-occurrence sub-entity can be shown in its own display area. If attribute "IsArray" is specified by a data model for an entity, then a new independent array can be defined. If not, a non-array multiple occurrence entity can be defined. Also, the interaction between the keying module 102 and the recognition engine 104 can be different when cells are part of an array. Specifically, for non-array cells, the recognition engine 104 can read simple field value and for array cells, the engine can read whole columns of data.

As can be understood by one having ordinary skill in the relevant art, there exist a many ways to select cells. In some implementations, an operator can change a current cell and depending on the current cell, a set of selected cells can be automatically generated. The current cell can be displayed as a current cell, while the other selected cells can be displayed as selected. Such selection depends on a type of the current cells. For example, if the current cell is an entity or a field name, then all cells below it can be selected. If the current cell is a field value, then it can be selected. If it is a new occurrence cell, then part of the last row of a multiple occurrence entity can be selected. If the cell (and thereby the row) is part of an array, then all cells of the same column belonging to the entity occurrence can be selected. If the cell is not part of an array, then the cell can be selected. Also, if the cell is a total value, then it can be also selected.

In some implementations, selected cells can be displayed in boxes or in any other fashion. For example, boxes can be displayed to reflect location on the pages of the selected cell's values and labels. The value, title, etc. boxes can be displayed using different colors. A value box can represent a bounding box of all the values concerned by the selected cells. A title box can represent a box of a title associated with the current cell. A box can be defined by four coordinates and a page index inside its document. A box containing a composition of all selected individual cell' bounding value boxes can be displayed within the current page. Further, a title box of the current cell can be displayed, if any.

Input/Output Format(s) of the Keying Module

The keying module 102 can be configured to have a predetermined input/output format for the purposes of processing a document. In some implementations, an input format can include an eXtensible Markup Language ("XML") file that includes a list of documents (that can contain one or more pages). These can also include images from the documents as well as information structured by the data model which can be available on the documents and/or pages. For example, it can be possible to re-start the keying module from data already partially recognized by an automatic processing, or data already partially keyed during a previous keying session. In some implementations, the input format can include an XML file that can be a flow. This means that the keying module 102 does not need to read the entire file before starting the keying processing, although it may pre-process images in advance while the keying module 102 is operating. For example, the input XML file can be piped to an output of a running program. In some implementations, the output format can be an XML file structured by the data model and providing the keyed values. Statistics about the keying (e.g., keying time, number of characters entered, number of mouse clicks, etc.) can also be part of the output.

Processing of Object Entities

The following is a description of an exemplary method of processing documents by the keying module 102, according to some implementations of the current subject. In some implementations, the keying module 102 can be configured to match items in a data model to various zones in the document's pages. The processing performed by the keying module 102 can include the following operations: initialization, offline analysis, interactive requests, and releasing of resources. During initialization, a call can be performed to initialize or start the keying module 102, which can allow licensing control to occur. During offline analysis, a call can be performed before the keying module 102 is presented with the document's pages. Preparation of other requests and/or execution of commands not requiring operator input can also occur during this operation. Location and recognition requests guided by operator's input can be performed during the interactive requests operation. Once all interactive requests have been performed/processed, release of resources allocated on a given page can occur.

During initialization operation, the keying module 102 is initialized along with its license control mechanisms. In some implementations, a separate hardware component, or a dongle, can be used to initialize the keying module 102.

The pre-processing operation(s) of the offline analysis operation can include various operations such as offline analysis (e.g., "PageOpen"), operator-directed pre-processing (e.g., "PageCorrect"), and closing of all resources allocated by PageOpen operations (e.g., "PageClose"). Each of these is discussed in detail below.

The offline analysis or PageOpen operation can be configured to occur on a single page as well as performed in advance prior to the keying module 102 being presented with a document for processing. PageOpen operation can be further configured to perform at least one of the following operations: image load and binarization, skew correction, orientation correction, license control, Document Layout Analysis ("DLA") and transcription of general purpose text, any automatic extraction of data (which may or may not require location commands from an operator (e.g., a stable keyword allows to retrieve an invoice number automatically)), and/or any other operations. The PageOpen operation can be configured to have a plurality of input parameters that can include image(s), page pre-processing list(s), and any requests that are to be performed prior to interaction with the document. The output of the PageOpen operation includes but is not limited to preprocessed image(s), results of offline processing, and any other information that may be necessary for passing information between several independent requests.

The PageCorrect operation can be configured to perform additional pre-processing of any automated pre-processing result that has been performed by the keying module 102. In some implementations, the PageCorrect operation can include a manual orientation correction (such as, image rotations using a predetermined angle (e.g., 90 degrees)).

The PageClose operation can be configured to close all resources that have been allocated or otherwise initiated by the PageOpen operation.

Following the offline analysis operation, the system 100 proceeds to perform interactive request operations. These include, but are not limited to, providing field location information for recognition purposes (e.g., "FieldLocateAndReco" operation), providing column location information for recognition purposes (e.g., "ColumnLocateAndReco" operation), providing location information for data located within an array for recognition purposes (e.g., "ColumnLocateAndRecoWithArrayContext" operation), providing location information for data located within an array based on prior knowledge of a column location information for recognition purposes (e.g., "ArrayLocateAndRecoWithArrayContext" operation), and other operations. Each of the operations is discussed in further detail below.

During the FieldLocateAndReco operation, an operator can provide location information and request recognition of one of the fields defined in the data model. The location information can include a single point in the document, a bounding box of a field (either as a first definition or as a correcting action on the result of a prior call to FieldLocateAndReco operation), a vertical line in a document, a horizontal line in a document, or any other location information. In some implementations, the FieldLocateAndReco operation can be configured to perform search of a predetermined area within the document based on the provided information and predetermined field information.

Input parameters for the FieldLocateAndReco operation can include location around which a particular field is to be found and/or a type of field that is to be recognized. Based on these inputs, an output of this operation can include a bounding box of the recognized field and/or a field value and a score.

The FieldLocateAndReco operation can be configured to allow operators to progressively enter of addresses in address block fields. In this case, location and recognition requests can be made using entire address blocks. The requested output semantic results depend on the data model, more precisely on the list of requested subfields for the Address field. This operation can allow an operator 150 to correct retrieved/recognized answers from a less precise or detailed level to a more precise or detailed level. Depending on the information obtained, an operator can request additional or more detailed address information that includes specific destination, city, state, zip code, etc. Such information can be obtained based on defining new address parameters, which can correspond to the destination, city, state, zip code, etc. In some implementations, the system 100 can be configured to provide an operation with a plurality of results that correspond to an address field based on the recognized information. Based on the plurality of results, the operation can select a desired address.

The address can be split among a plurality of "geo" fields (i.e., fields corresponding to a particular address, e.g., street number, street name, city, state, zip code, country, etc.). In this case, the operator can progressively request recognition of each address geo field. The operator can begin recognition of fields that contain less precise information and proceed toward fields having more detailed information.

As can be understood by one having ordinary skill in the relevant art, the above discussion is not limited to the address fields and can be applicable to any fields inside an object that is being processed by the system 100.

The ColumnLocateAndReco operation can be configured to provide location information concerning a particular column within the document being processed and request recognition engine 104 to locate that column and perform recognition of it. In some implementations, the column location information can be provide in the form of a single point in the middle of the column ("Dot"), a bounding box of the column's content or as a correction of the bounding box of the column's content as returned by a previous call of ColumnLocateAndReco operation ("Box"), a vertical line between the first and the last row of the column ("VLine"), and/or a horizontal line that provide a horizontal extension of the column ("HLine"). In some implementations, the type of cells inside the column may be known. Using these commands, the recognition engine 104 can be configured to perform various operations in vertical and horizontal dimensions. Specifically, using the Dot and HLine commands, the recognition engine 104 can be configured to search a first row of the column using a predetermined vertical ("y") coordinate as a starting point and continuing in a upward vertical direction (e.g., toward the top of the page) for the remaining rows. The recognition engine 104 can be configured to return results from its search as long as it finds items that correspond to the description of a cell type. Using Box and VLine commands, the recognition engine 104 can be configured to create a row for all items that are found in its search of vertical columns (e.g., $y_{top}$ to $y_{bottom}$ coordinates) that meet the criteria of a predetermined cell type. Items that do not meet the predetermined cell type criteria are excluded from the row. Using the Dot and VLine commands, the recognition engine 104 can be configured to determine a "width" (i.e., a number of characters/words in a particular cell of a column). In some implementations, the recognition engine 104 can be configured to use column width of other columns that have been previously located and recognized. Using the Box and HLine, the recognition engine can be configured to determine the width of the column based on a predetermined width indication that can be provided to the engine 104.

The input parameters to the ColumnLocateAndReco operation can include a location around which the field is to be found and a type of a field to be recognized. The ColumnLocateAndReco outputs bounding box(es) of the recognized cells and cell values and scores. The cell types can include types from at least one of the following fields: address, alpha, amount, check box, city, zip code, date, destination, first name, last name, middle initial, name, name and address, numeric, telephone number, short zip code (e.g., without extra digits), social security number, state, street, text, percent, time, etc.

EXAMPLES

Example 1

FIG. 6 illustrates an exemplary document that can be submitted to the system 100 for processing and recognition using the ColumnLocateAndReco command, according to some implementations of the current subject matter. This example illustrates use of a Dot command for indication in the middle of a column and use of VLine command for vertical line indication.

Referring to FIG. 6, the ColumnLocateAndReco operation is called on the first column using a Dot command on a second non-header line (i.e., "ABC101"/"FLUOROSCOPY" . . . /"01/01/2000"/ . . . . /"$50,000"), i.e., an operator may be pointing to a location somewhere in the cell of the second row ("ABC101"). Thus, if the column's cell type is "text" that contains no other constrains and has a one-word as a default parameter, then ColumnLocateAndReco operation outputs "ABC101/ABC102" as the expected result. The location information comprises the ABC101 line, as indicated by an operator pointing (e.g., with a mouse cursor). In some implementations, the system can be configured to determine that "PROCEDURE ABC" (shown in FIG. 6) includes two columns below and that the requested first column is one of them.

With regard to the VLine command, the system can be configured to draw a vertical line from a row containing "ABC101" cell to the last row (containing "OPQ102" cell), the system can be configured to retrieve all items between "ABC101" and "OPQ102" rows and skip "PROCEDURE EFG", "13", "MEDICATIONS", "425" "0123", "1000", and "DEVICES" rows, because these rows do not contain the requisite cell type.

The ColumnLocateAndRecoWithArrayContext command can be used for recognizing information based on location information in the middle of a column and validated results of location information from another column that belongs to the same array. This command can be configured use the similar input information as the ColumnLocateAndReco command discussed above as well as an exact number of rows to be expected inside an array and information concerning bounding box(es) of individual cell(s) of the validated column(s) belonging to the same array.

Example 2

FIG. 7 illustrates an exemplary document that can be submitted to the system 100 for processing and recognition using the ColumnLocateAndRecoWithArrayContext command, according to some implementations of the current subject matter. This example illustrates use of a Dot command for indication in the middle of a column.

Once a first column ("Code") has been recognized and corrected by an operator, the operator can indicate a dot (using a Dot command) in the middle of the second column ("Description"). The ColumnLocateAndRecoWithArrayContext command generates nine cells which correspond to the word entries in the middle column and are correlated to the numbers in the first column. In some implementations, items such as "Sub-Total Consultation", "Sub-Total Radiography", "Sub-Total Testing" and "Sub-Total Pharmacy" can be skipped as not containing any information and not corresponding to any items in the first column.

The ArrayLocateAndRecoWithArrayContext command can be used when an operator clicks in a middle of an array while the keying module already determined which columns will be required for recognition and what are the horizontal separations of the columns. The recognition engine 104 can be configured to use horizontal coordinates (i.e., x coordinates) and a list of expected column types to recognize information. In some implementations, this feature can be useful when an array is split between several subtotals, or when several arrays with the same format are present in the document. This command can accept a list of horizontal coordinate (e.g., x-coordinates) ranges for each of the expected columns as well as a type of cells for each column. The output includes bounding box(es) of each of the cells and values and scores for each of the cells.

Example 3

FIGS. 8a-b illustrate an exemplary document (e.g., EOB document) that can be submitted to the system 100 for processing and recognition using the ArrayLocateAndRecoWithArrayContext command, according to some implementations of the current subject matter. Once information in the first array ("John Smith") has been recognized and verified and while the information in the first column of the second array ("Mary Jones") is being processed, the recognition engine 104 can be configured to locate and recognize the similar columns of the second array that have been already located and recognized in the first array ("John Smith"). In some implementations, the location information provided by the keying module can be understood in the context of the first column. A box or a horizontal line can be drawn and interpreted as relative to the column only, but not to the whole array. However, in some implementations, entire arrays can be selected.

Referring to FIG. 8b, in case an operator indicates a single position for a particular information, the ArrayLocateAndRecoWithArrayContext command can be called after "425—Medications" and can stop after "HJK103" but not go through "123—Liquid Medication" entries. If the operator indicates a vertical Line, starting after "425—Medications" and up to the last row, all rows can be included in the result, whereas "0123", "Devices", and "1000" rows can be skipped.

Example 4

FIGS. 9a-q illustrate various interaction scenarios with the recognition engine 104, according to some implementations of the current subject matter. As stated above, the recognition engine 104 and the keying module 102 can be configured to implement a data grid that can display a hierarchical structure of an instance of a data model on the document images. The data grid can include cells that include an entity name, an entity label, a field name, a field value, and a total value (which can be provided for fields having multiple occurrences entities). The data grid can include several separate display areas, where each display area can be associated with a root entity. Further, some entities can have multiple occurrences, where some multiple occurrence entities can be defined as a root entity of an array. Inside the whole data grid, on the lower level display area, one of the selected cells can be a current cell. A scope of location/recognition commands can include a list of selected cells.

Figure 9B:
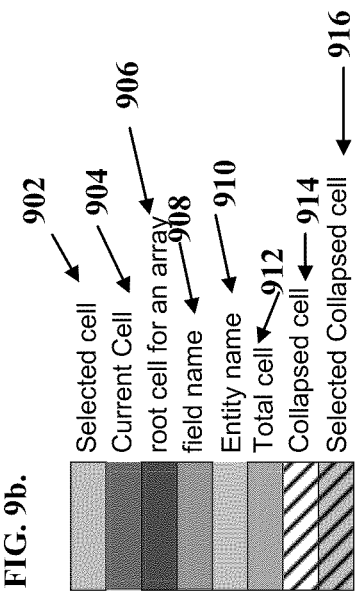
Figure 9C:
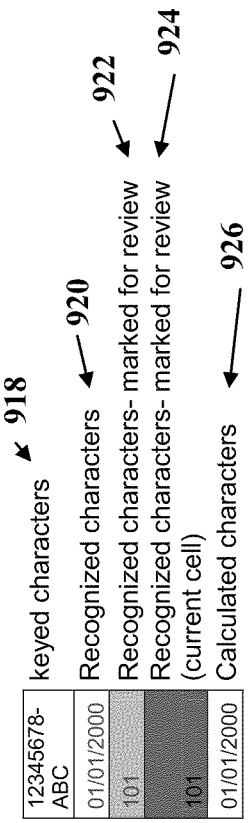
Figure 9D:
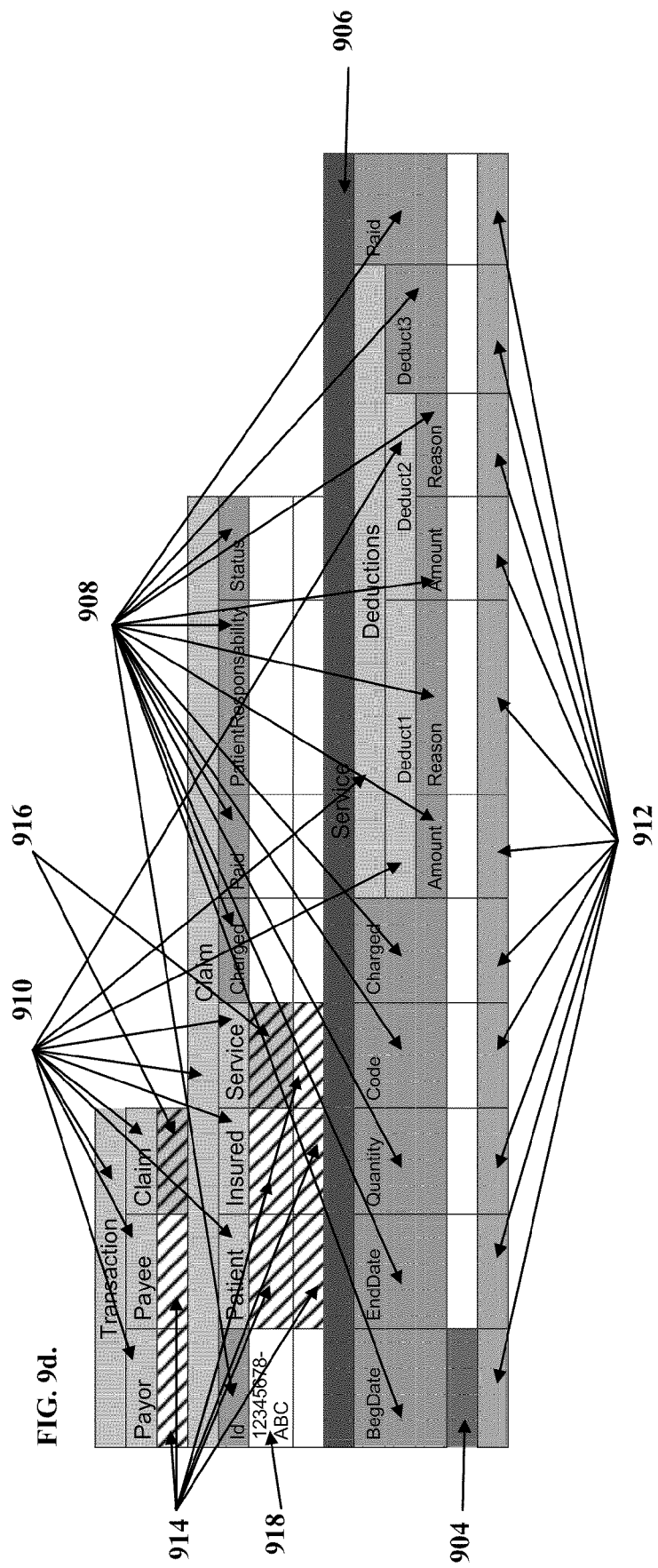
Figure 9E:
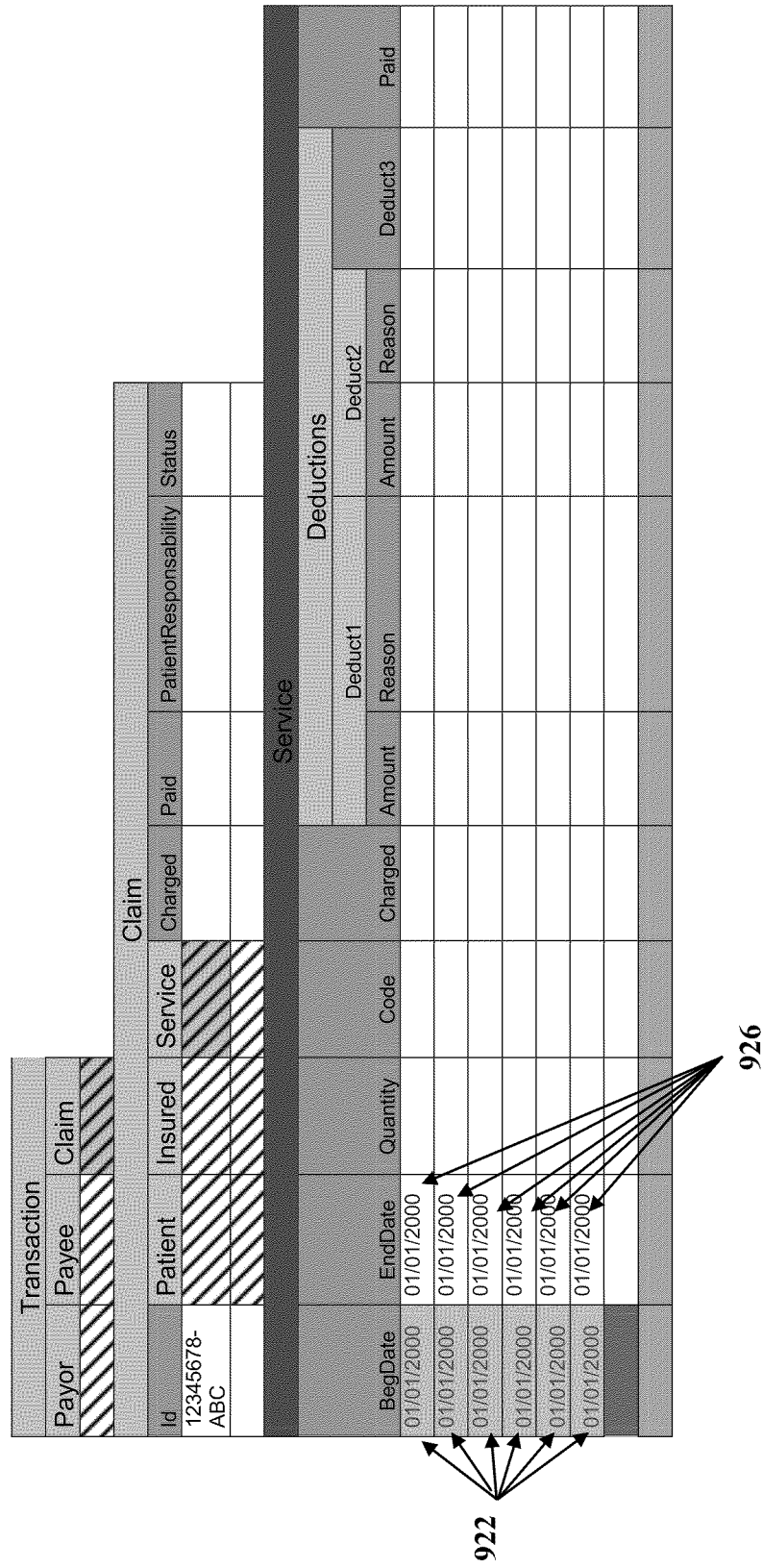
Figure 9F:
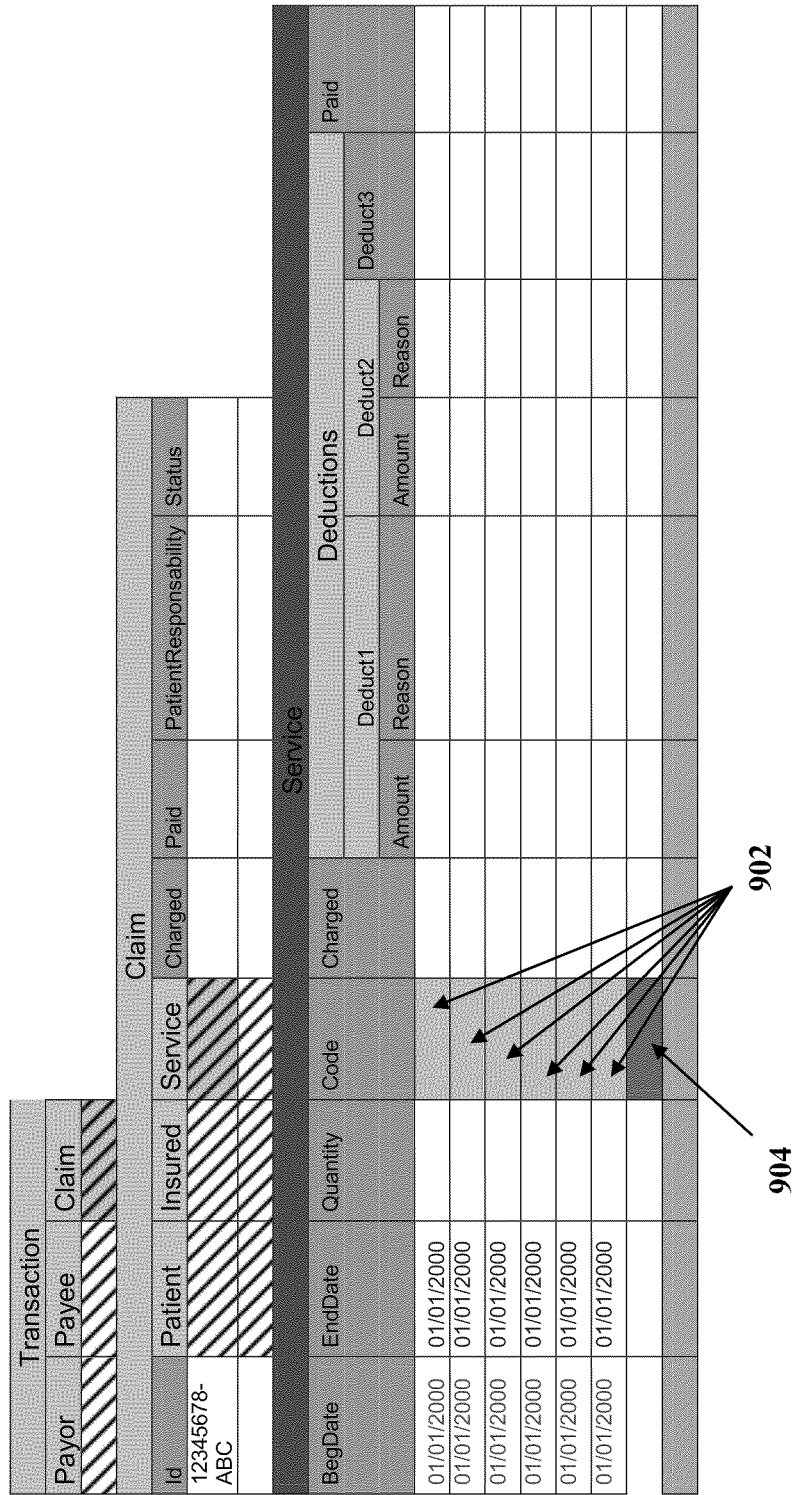

FIG. 9a illustrates an exemplary EOB statement document that can be presented for recognition. In some implementations, the system 100 can be configured to designate cells using various color schemes, as indicated in FIGS. 9b-9c. For example, particular colors can be assigned to a selected cell 902, a current cell 904, a root cell for an array 906, a field name 908, an entity name 910, a total cell 912, a collapsed cell 914, and a selected collapsed cell 916. Characters that are being processed can also be color coded as well, where particular colors can be assigned to keyed characters 918, recognized characters 920, recognized characters that are marked for review 922, recognized characters that are marked for review in the current cell 924, and calculated characters 926. As can be understood by one having ordinary skill in the relevant art, any designation scheme can be chosen to distinguish between various cells and characters inside each cell that are being processed by the system 100. Hence, the current subject matter is not limited to the illustrated implementations. Referring to FIG. 9d, the current cell 904 is selected for processing after receiving payor, payee, claim ID, and any other information concerning the EOB document being processed and is located in the column "BegDate". Then, the operator can click or select any of the dates shown in the EOB document (FIG. 9e). The system 100 can automatically locate and recognize the column of the selected cell using a Dot command of the ColumnLocateAndReco operation. The values of "EndDate" can be obtained through various calculations. At which point, all column values are selected and a bounding box for all column values in the BegDate column can be formed.

Figure 9G:
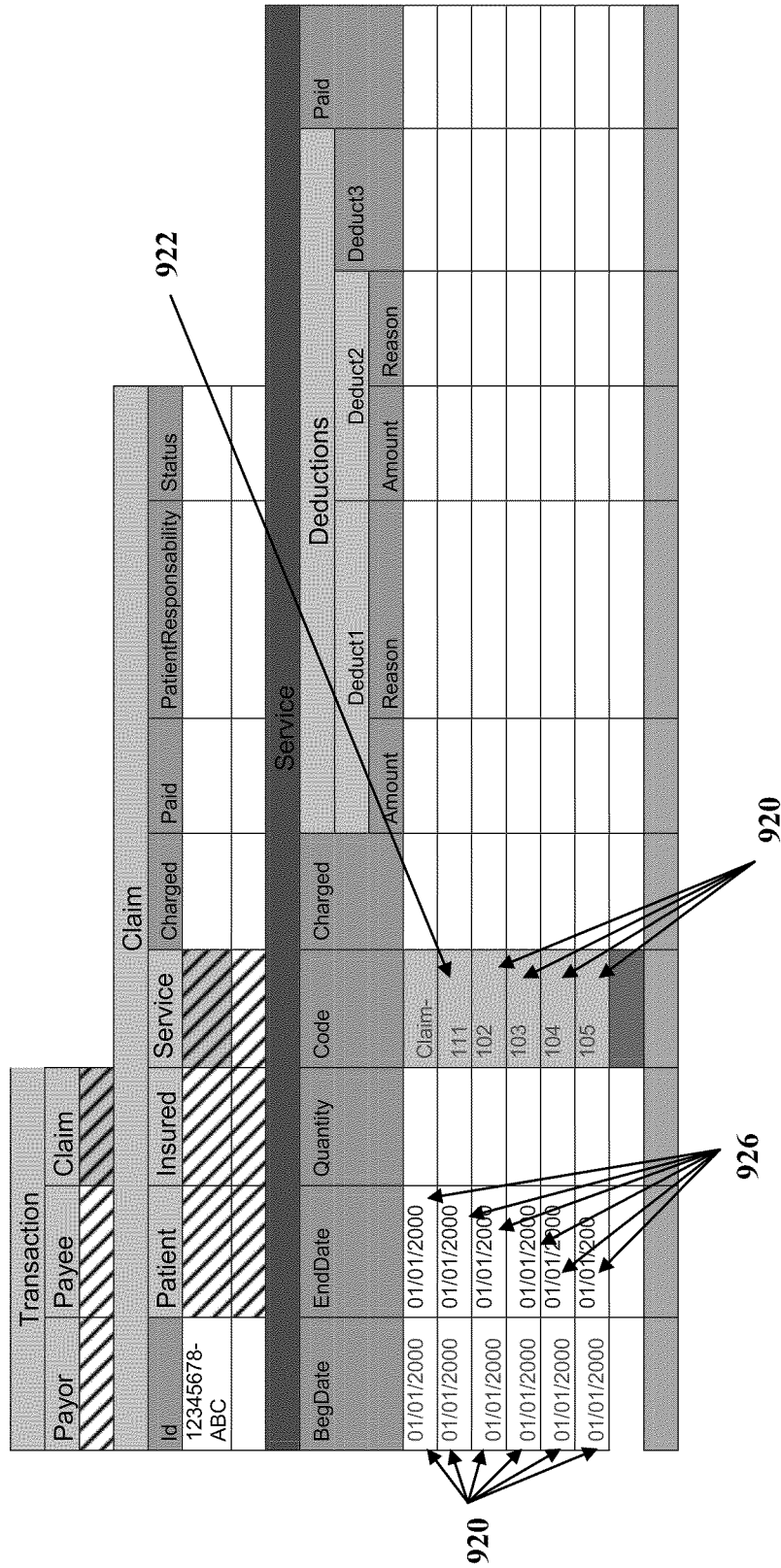

The operator can then proceed to the "Code" column (FIG. 9f) and click on the values in the "Code" column (FIG. 9g). The column can be automatically located and recognized using a Dot command of ColumnLocateAndRecoWithArrayContext operation. A bounding box is displayed of all column values in the code.

Since the last line in the column is missing and the first column was extracted with all the same dates, the operator may not have realized that the information as initially filled might not have been entirely accurate. At which point, the Box command of the ColumnLocateAndReco operation can be implemented (FIG. 9h). In some implementations, the keying module 102 can be configured to match the newly found cells of the Code column with the information corresponding to the previously determined dates in the BegDate column. If matching information is found, then the cells and/or lines containing cells are appropriately added to the columns.

Figure 9J:
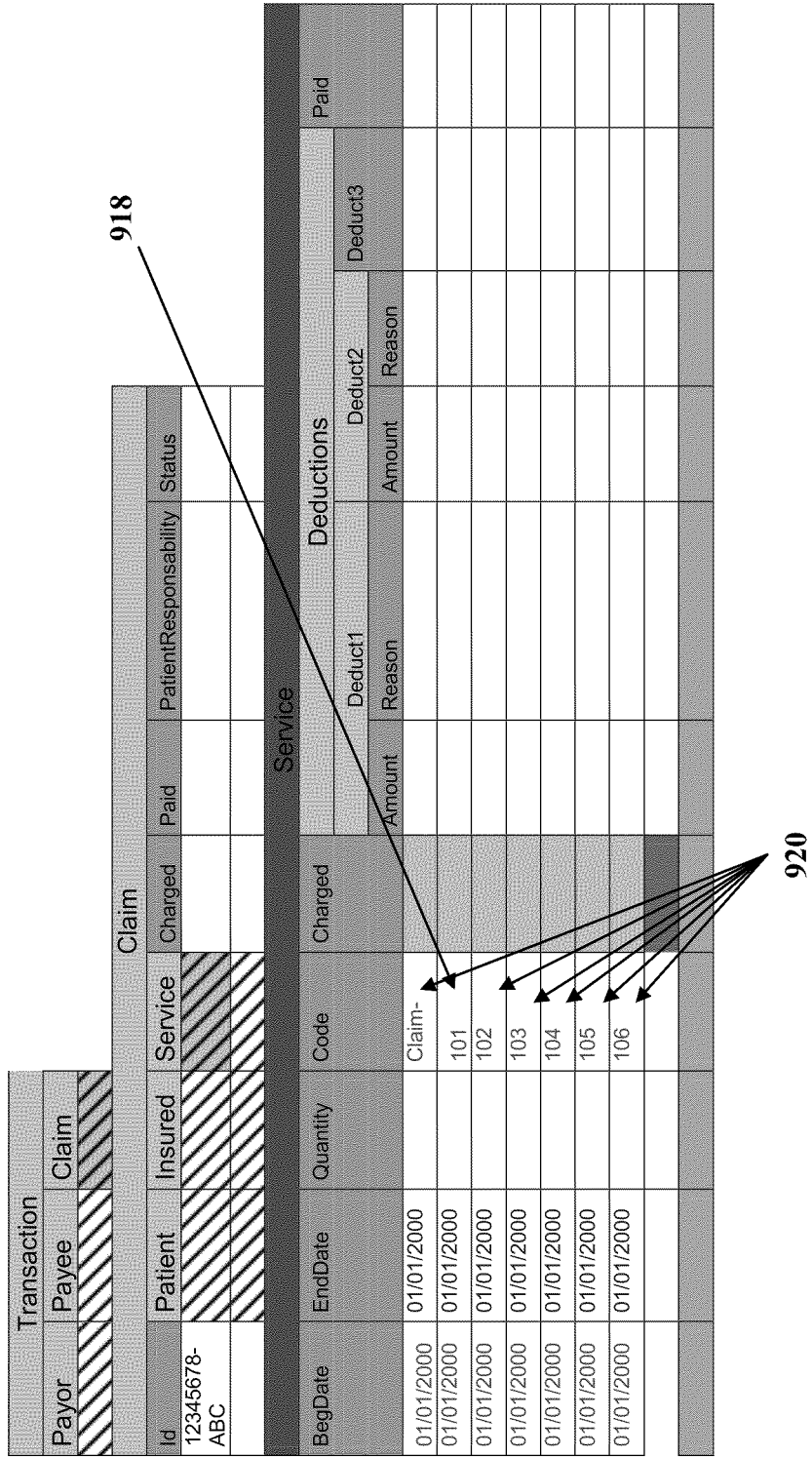
Figure 9K:
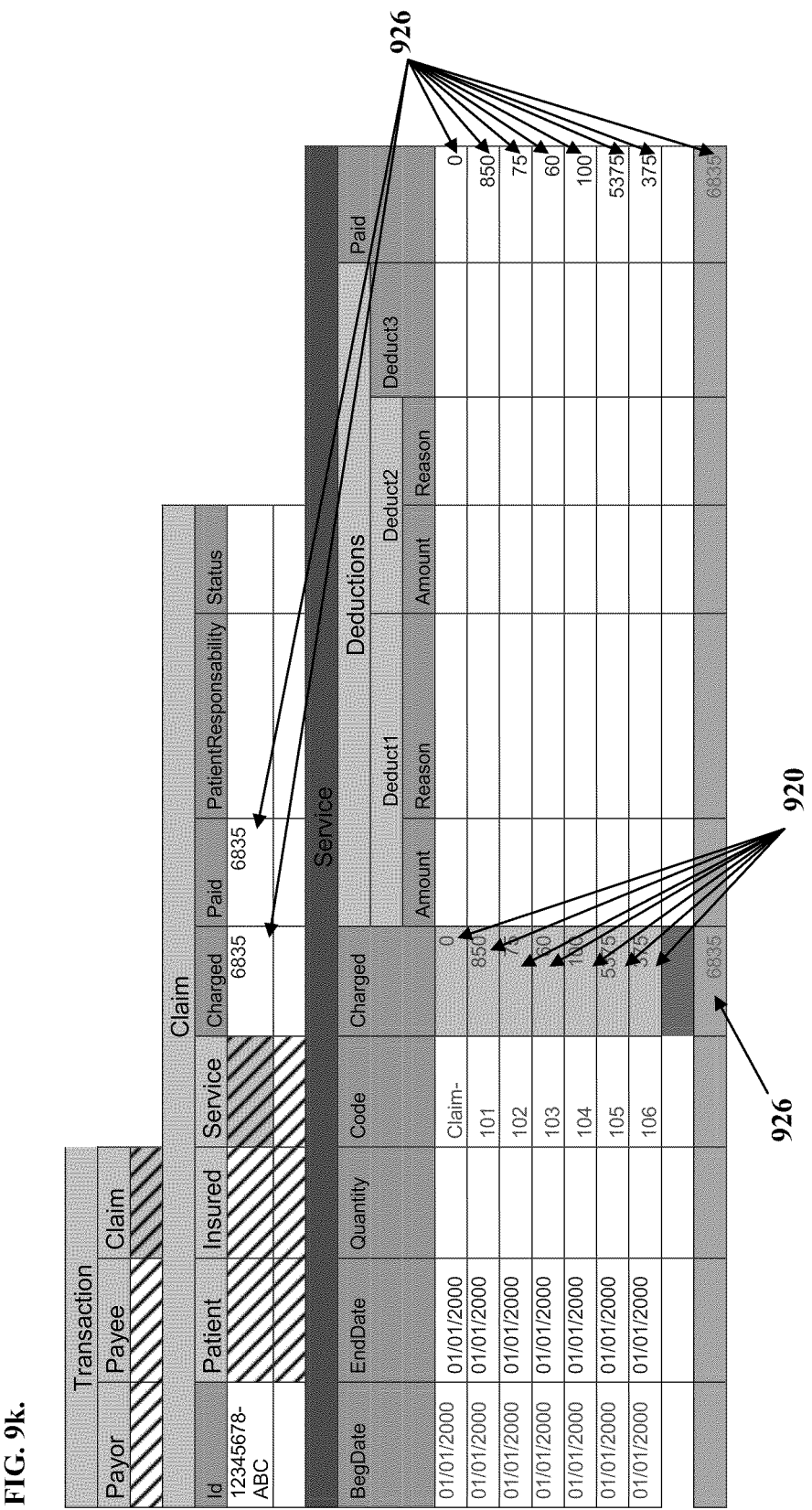

Referring to FIG. 9i, the operator can fill missing values in the BegDate column and then evaluate the recognition result 924. After reviewing and correcting any values in the determined recognition result 924, the operator can proceed to the next column (FIG. 9j), which is the "Charged" column. As shown in FIG. 9j, while all cells are selected in that column, the cells contain no values, as they have yet been determined. Once the operator clicks or otherwise selects the Charged column, the column is automatically located in the EOB document and recognized using Dot command of the ColumnLocateAndRecoWithArrayContext operation. Using the information from the charged column, the "Paid" column values, the "Total" values, and the "Charged" and "Paid" field values are automatically calculated, as shown in FIG. 9*k*.

The operator then proceeds to the "Deduct3" column (FIG. 9*l*) and selects all values in that column. The column is automatically located and recognized using a Dot command of the ColumnLocateAndRecoWithArrayContext operation. Results can be presented inside the "Deduct3" column. The "Paid" column is automatically updated; totals for the "Paid" and "Deduct3" columns are calculated; and the "Paid" field of the claim entity is updated (FIG. 9*m*).

Figure 9N:
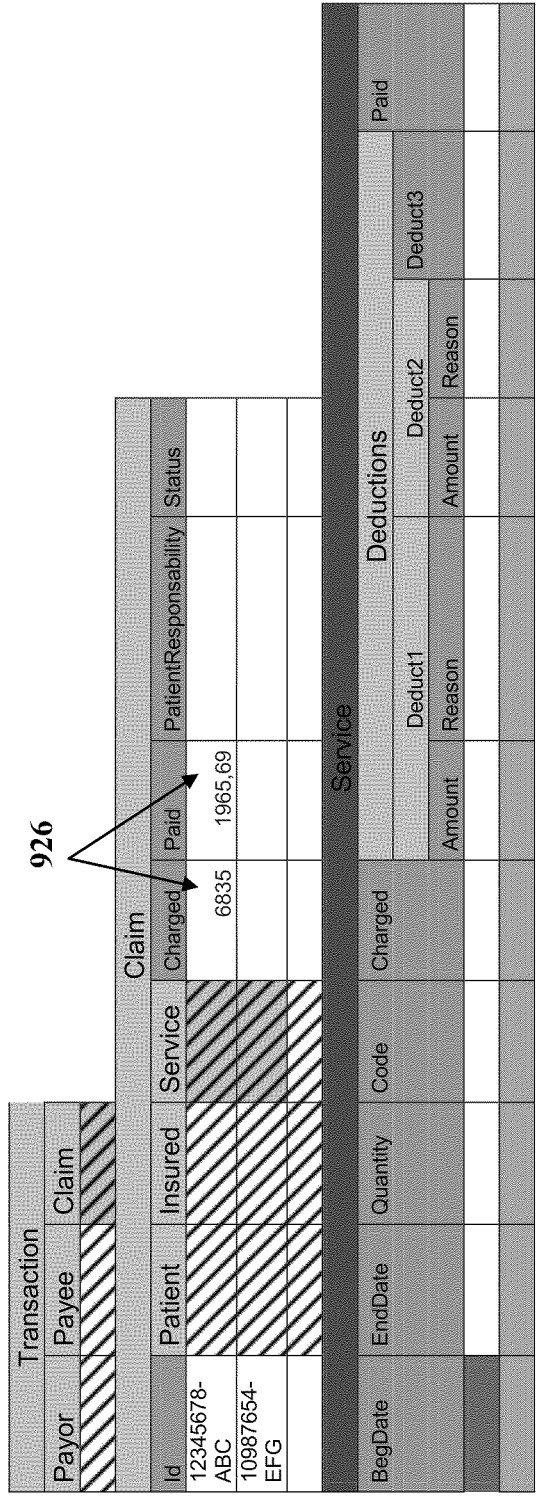
Figure 9O:
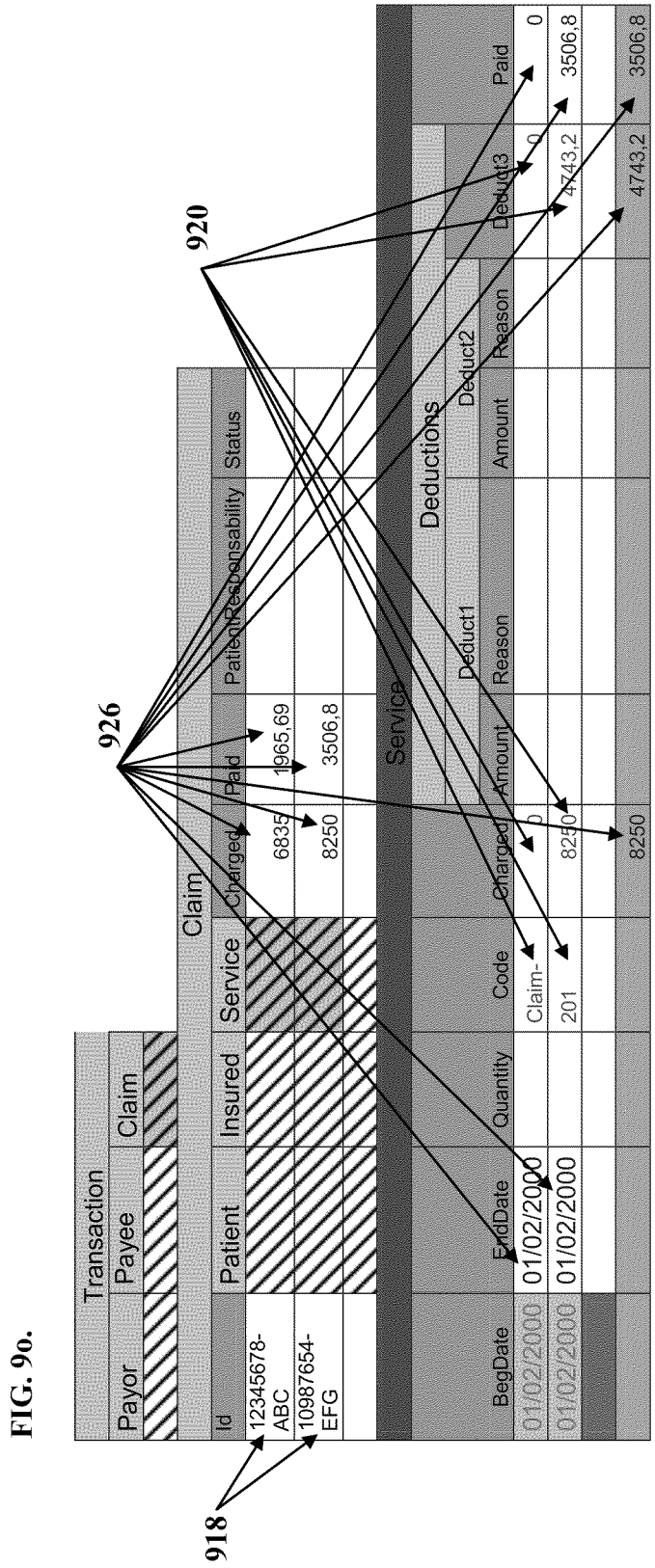

Once the information concerning this patient is complete, the operator can proceed to a next claim along with its ID, patient, insured information, as shown in FIG. 9*n* ("ID" no. 10987654-EFG). The operator can click anywhere on the "Date" column of the second array and information in the "BegDate", "Code", "Charged", "Deduct3" columns can be recognized using ArrayLocateAndRecoWithArrayContext operation (FIG. 9*o*). The operator can then proceed to the "Deduct3" column and enter new values inside this column (FIG. 9*p*). The operator can also validate any values in that column (FIG. 9*q*). After this, new claims can be entered into the system.

FIGS. 10*a-c* illustrate loading of a new document into the system along with its appropriate information. As can be understood by one having ordinary sill in the relevant art, the system 100 can load another page of the same document and/or an entirely new document.

Figure 11:
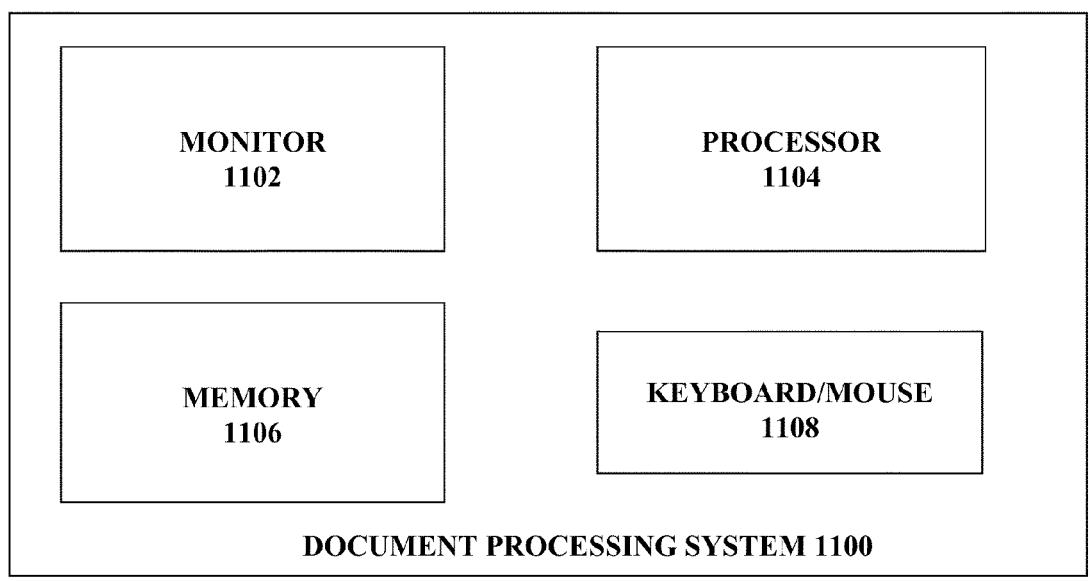
FIG. 11 illustrates an exemplary system for processing object entities, according to some implementations of the current subject matter.

FIG. 11 is a block diagram that illustrates an exemplary system 1100 for processing documents, according to some implementations of the current subject matter. The system 1100 can be configured to include a monitor or display 1102, a processor unit 1104, a memory 1106, and a keyboard/mouse unit(s) 1108. In some implementations, the system 1100 can be configured to have network capabilities and can be coupled to various external systems, processors, storage devices, or any other equipment. Such network capabilities can include wired connections, wireless connections, WAN, MAN, LAN, or any other types of networks. The processor unit 1104 can be configured to control various processing aspects of the system 1100. The display 1102 can be configured to provide a graphical user interface ("GUI") to the user and display results of processing as well as provide other functionalities and features contemplated by the current subject matter. The memory 1106 can be configured provide temporary and/or permanent storage capacity to the system 1100.

Figure 12:
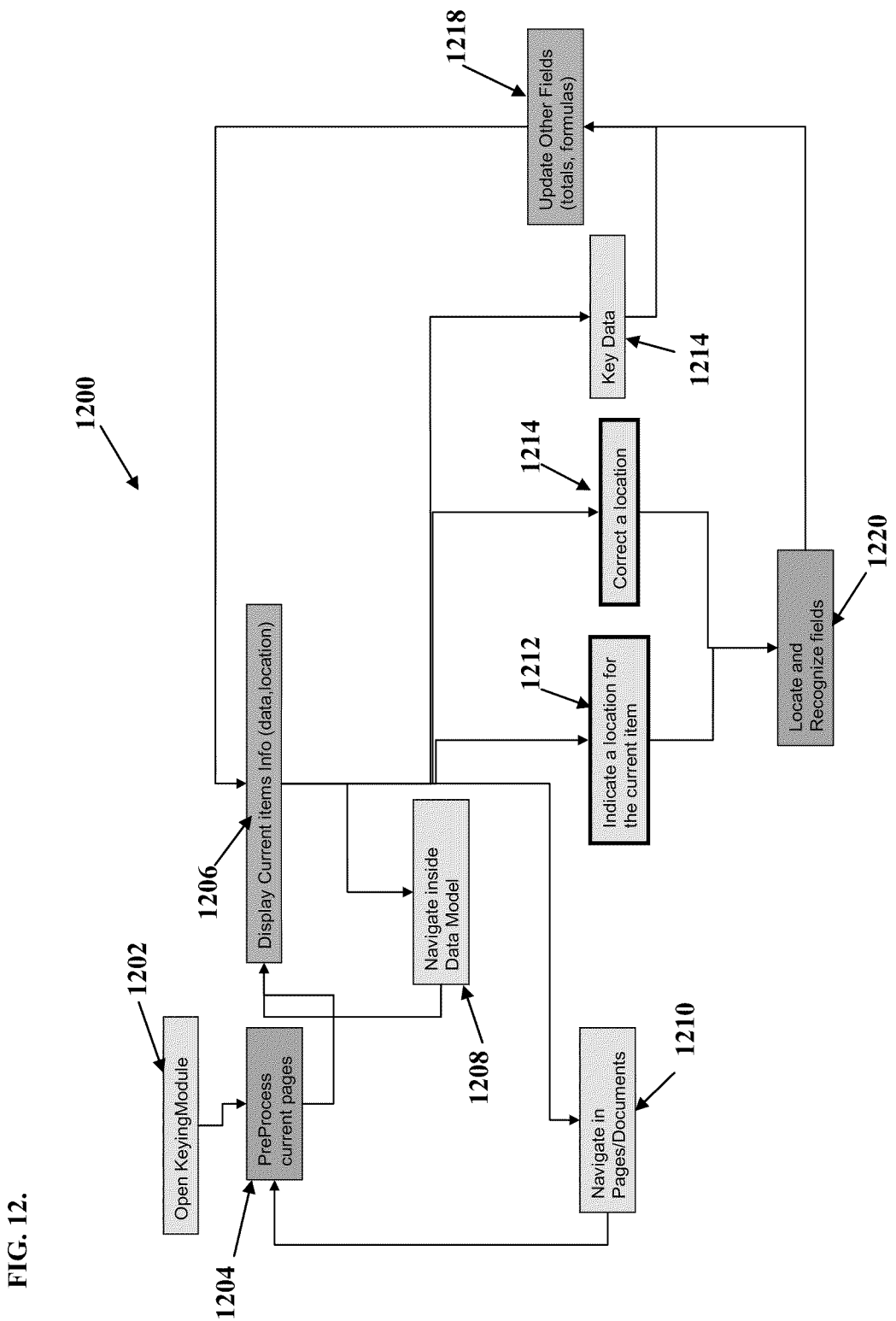
FIG. 12 is an exemplary flow chart for processing object entities, according to some implementations of the current subject matter.

FIG. 12 illustrates an exemplary method 1200 for operating of the keying module 102, according to some implementations of the current subject matter. The method 1200 begins with initializing the keying module 102, at 1202. At this point, an object entity (e.g., a document) can be presented to the keying module 102 for pre-processing (e.g., page(s) in the document(s) can be preprocessed), at 1204. Once the document has been preprocessed, the keying model 102 can be configured to display data, values, location, as well as any other information concerning object(s) and/or item(s) in the document being processed, at 1206. The displayed information can then be provided for navigation inside a data model that can be predetermined for the particular object entity being processed (e.g., EOB document data model), at 1208. The information can also be provided to the operator 150 for navigation inside the object entity, at 1210. The operator can indicate location of item(s) (at 1212), correct location(s) of item(s) (at 1214). The location information from 1212 and 1214 can be provided for location and recognition by the recognition engine 104, at 1220. The operator can also key-in data for any item, at 1216. The recognized data and/or keyed-in data can be used to update location, value, field information concerning for any selected item in the object entity. The information can include information about precise locations, field values, as well as, enriched document definitions. As can be understood by one having ordinary skill in the art, the output is not limited to the one shown.

Figure 13:
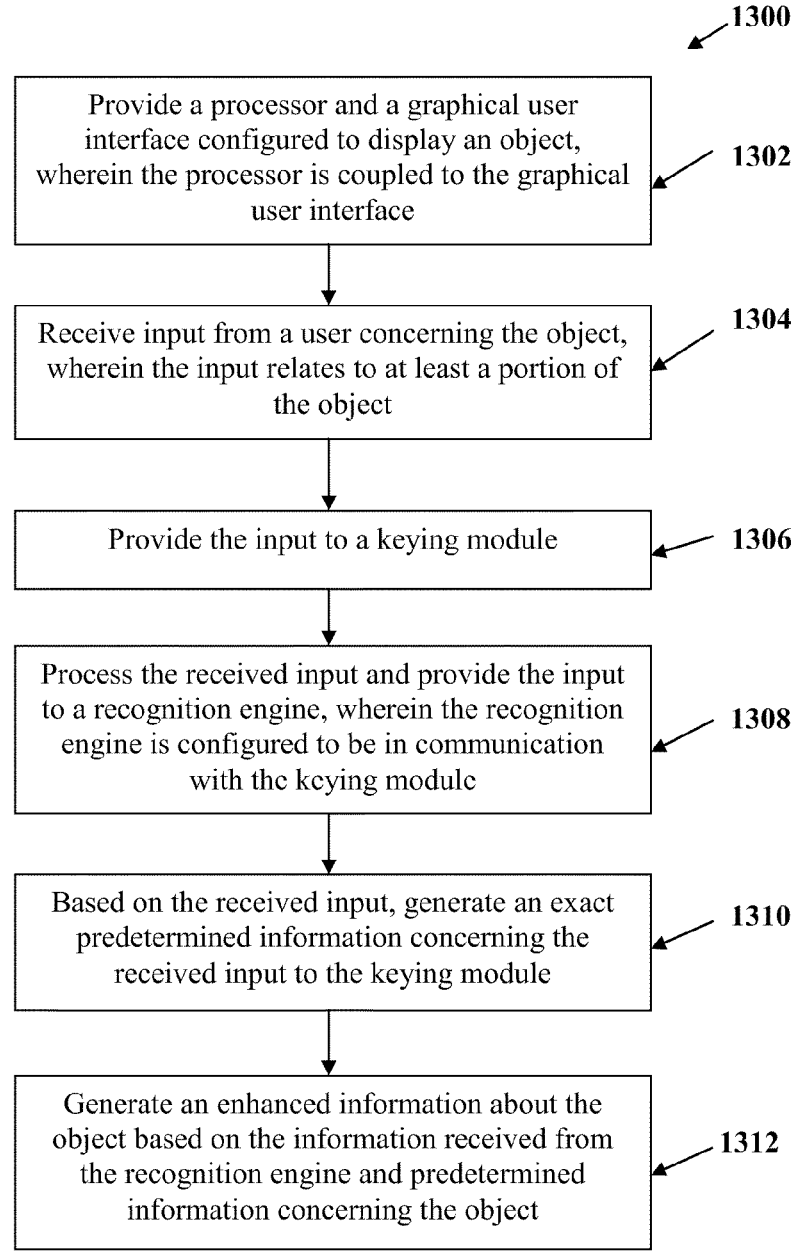
FIG. 13 is another exemplary flow chart for processing object entities, according to some implementations of the current subject matter.

FIG. 13 illustrates an exemplary method 1300 for processing of object entities, according to some implementations of the current subject matter. At 1302, a processor and a graphical user interface can be configured to display an object, where the processor can be coupled to the graphical user interface.

At 1304, input from a user 150 concerning the object entity can be received, where the input relates to at least a portion of the object entity. At 1306, the input can be provided by the processor to the keying module 102.

At 1308, the keying module 102 can process the received input and provide it to the recognition engine 104. The recognition engine can be configured to be in communication with the keying module 102.

At 1310, the recognition engine, based on the received input, can generate an exact predetermined information concerning the received input to the keying module 102;

At 1312, the keying module 102 can generate an enhanced information about the object based on the information received from the recognition engine 104 and predetermined information concerning the object.

In some implementations, the input concerning the object can be received from the user 150 via the graphical user interface. The input concerning the object can include an incomplete information about a location of and a field value for an item within the object. The incomplete information can be provided to the recognition engine 104 via the keying module for generating a precise location information and a precise field value information for the item. The precise location and field value information for the item can be provided to the keying module. The predetermined information concerning the object can include object and data model definitions. Based on the object and data model definitions and the location and field value information, the keying module can be configured to generate enriched object definitions and to provide document and data model visualization to the user.

In some implementations, the keying module can be configured to pre-process at least one portion within the object and to display information concerning the at least one portion. The keying module 102 can be configured to allow navigation within the object to locate the item.

In some implementations, the object can be a document containing at least one page and the item is configured to represent a user-specified location on the at least one page. The data model definition can include definitions of field information that may be entered by a user, organization of the field information into at least one group, and format of data that is to be imported and/or exported.

In some implementations, the processor can be configured to perform pre-processing of objects, locating blocks and columns of data having known types, and recognizing blocks and columns of data. The keying module can be configured to provide object license control features including recognition engine license control and graphical user interface control.

The following illustrates various advantages of the current subject matter. As can be understood by one skilled in the art, the current subject matter is not limited to the advantages discussed below. The current subject matter is capable of improving operator's productivity or keying module's productivity when information about a particular location within the document is too complex for an automatic recognition to determine. Further, the current subject matter allows for an easy setup of custom applications without requiring separate adaptation to existing systems. The current subject matter also allows a tight integration between recognition engine and the keying process and implements efficient heuristics that allow increase in a productivity of a keying operator.

In some implementations, the current subject matter relates to a method for image and/or document processing. The method includes loading a description of a data model, including definition(s) of the data to be keyed. Once the data model is loaded, a list of multi-page documents is processed. This allows keying of items in the data model from the document's pages. Then, during the keying process, the operator can request selected recognition of objects within the document. Such recognition can be obtained from recognition engine.

In some implementations, the data model can be configured to include fields that may be entered by a keying operator (whether manually or automatically). The data model can further include a structure or organization of the fields into specific groups or entities. The groups can be configured to include one or more common features, common characteristics, or occurrences. In some implementations, a format of data can be imported and exported from other sources.

As stated above, in order to navigate within the data model, a keying module can be used. Some common basic features of the keying module that are implemented prior to using the recognition engine include: displaying the data model; displaying pages of a current document, including zoom and loop features, basic object and/or document rotation utilities for use on current page(s) being displayed, and navigation features for navigating inside a data model.

The current subject matter's recognition engine can be configured to provide further features in addition to those listed above. These include pre-processing of objects and/or documents that can be applied to documents (for example, these include auto-detection of orientation of an object, a page, or a document, deskewing feature (i.e., removal skew from images)); locating of blocs and columns of data of known type(s) based on a position of a mouse, a straight line, and/or a bounding box; and recognizing blocs and columns of data inside a bounding box based on the knowledge of the data type. As can be understood by one having ordinary skill in the art, the current subject matter is not limited to the features and advantages discussed above.

In some implementations, the keying module can be configured to be adapted to a specific document that is being recognized. The keying module is configured to deal with complex data structures in the documents having variable layouts. In some implementations, the layout for a given substructure may be repetitive inside the same document. For example, inside an explanation-of-benefits ("EOB") document, a document may present several instances of service arrays with a precise order of columns and a repetitive horizontal location of the columns.

During the keying of the document, when a new instance of the service array is keyed, a memory of the characteristics of the previously encountered array may be applied to the following instances, allowing changes to:
default navigation order (the order in which fields and entities will be entered);
default presentation of the fields of a given entity, matching the order of keying (primarily for columns); and
horizontal separation between columns in order to reduce the amount of location information requested from the user.

In some implementations, alternate keying models can be provided. For example, in document(s) workflow, repetitive types of documents may be encountered by the processing engine. Such types may be linked to values of some specified key fields. For instance, in the EOB document, the value of a provider name or identification ("ID") may be linked to a specific format(s). In some implementations, the current subject matter can be configured to include a library of such formats, which can be used to enable the keying module to speed up or otherwise streamline the keying process.

In some implementations, the keying module interface can be configured to provide one or more viewing areas, which allow displaying of the document pages and/or a zoom view. The viewing areas can be further configured to display boxes containing information being keyed. The interface can be further configured to provide a data grid view, which contains a representation of its hierarchical data model. In some implementations, the components (or items) of a data model are:
fields, which include typed items containing information; fields may be include subfields (e.g., an address block and its semantic components); and
entities, which represent grouping(s) of fields; entities can be configured to accept one or several occurrences; entities can further include fields and/or other entities; on a data grid, entities can be displayed within their hierarchical structure.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein can be implemented in a computing system that includes a back-end component, such as for example a data server, or that includes a middleware component, such as for example an application server, or that includes a front-end component, such as for example a client computer having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flow depicted in the accompanying figures and/or described herein does not necessarily require the particular order shown, or sequential order, to achieve desirable results. Other implementations may be within the scope of the following claim.

What is claimed:

1. A system, comprising:
   a processor coupled to a memory and a graphical user interface for displaying an object;
   the processor
      receives an input from a user concerning the object, wherein the input relating to a plurality of parts of at least one portion of the object, wherein each part of the at least one portion is separately identified by the user in the received input; and
      provides the received input to a keying module,
   wherein the keying module, based on the received input, a selectable list of object entities corresponding to the displayed object, and a predetermined data model corresponding to the displayed object,
      determines partial location data for each part of the at least one portion of the object, at least one field value for each part of the at least one portion of the object, and, optionally, at least one other information related to each part of the at least one portion of the object, wherein at least one object entity corresponding to each part of the at least one portion of the object is selected from the selectable list of object entities, wherein the predetermined data model includes at least one field, at least one object entity, at least one object label, and at least one object tag; and
      provides the received input, the determined partial location data for each part of the at least one portion of the object, the at least one field value for each part of the at least one portion of the object, and, optionally, the at least one other information related to each part of the at least one portion of the object to a recognition engine, the recognition engine is in communication with the keying module;
      based on the received input, the determined partial location data for each part of the at least one portion of the object, the at least one field value for each part of the at least one portion of the object, and, optionally, the at least one other information related to each part of the at least one portion of the object, the recognition engine
         generates a first information concerning the at least one portion of the object; and
         provides the first information to the keying module;
      the keying module generates an enhanced definition of the at least one portion of the object based on the first information received from the recognition engine and a second information concerning the at least one portion of the object stored by the keying module.

2. The system according to claim 1, wherein the input concerning the object is received from the user via the graphical user interface.

3. The system according to claim 1, wherein the input concerning the object includes an incomplete information about a location of and a field value for the at least the portion of the object.

4. The system according to claim 3, wherein the incomplete information is provided to the recognition engine via the keying module for generating a precise location information and a precise field value information for the at least the portion of the object;
   wherein the precise location and field value information for the at least the portion of the object are provided to the keying module.

5. The system according to claim 4, wherein the second information concerning the at least the portion of the object includes object and data model definitions;
   wherein based on the object and data model definitions and the location and field value information, the keying module generates enriched object definitions and to provide document and data model visualization to the user.

6. The system according to claim 1, wherein the keying module pre-processes the at least the portion of the object and displays a third information concerning the at least the portion of the object.

7. The system according to claim 6, wherein the keying module allows navigation within the object to locate the at least the portion of the object.

8. The system according to claim 1, wherein the object is a document containing at least one page and the at least the portion of the object is configured to represent a user-specified location on the at least one page.

9. The system according to claim 5, wherein the data model definition includes at least one of the following definitions: field information that may be entered by a user, organization of the field information into at least one group, and format of data that is to be imported and/or exported.

10. The system according to claim 1, wherein the processor performs at least one of the following functions: pre-processing of objects, locating blocks and columns of data having known types, and recognizing blocks and columns of data.

11. The system according to claim 1, wherein the keying module provides object control using at least one of the following: a recognition engine control and a graphical user interface control.

12. The system according to claim 1, wherein the object is configured to include at least one of the following characters: handwritten, typewritten/machine-written, drawn, painted, stamped, imprinted, imbedded, or contained within the object in any other form.

13. A computer-implemented method, comprising:
providing a processor and a graphical user interface for displaying an object, wherein the processor is coupled to the graphical user interface;
using the processor,
receiving an input from a user concerning the object, wherein the input relating to a plurality of parts of at least one portion of the object, wherein each part of the at least one portion is separately identified by the user in the received input;
providing the received input to a keying module;
using the keying module, based on the received input, a selectable list of object entities corresponding to the displayed object, and a predetermined data model corresponding to the displayed object,
determining partial location data for each part of the at least one portion of the object, at least one field value for each part of the at least one portion of the object, and, optionally, at least one other information related to each part of the at least one portion of the object, wherein at least one object entity corresponding to each part of the at least one portion of the object is selected from the selectable list of object entities, wherein the predetermined data model includes at least one field, at least one object entity, at least one object label, and at least one object tag; and
providing the received input, the determined partial location data for each part of the at least one portion of the object, the at least one field value for each part of the at least one portion of the object, and, optionally, the at least one other information related to each part of the at least one portion of the object to a recognition engine, the recognition engine being in communication with the keying module;
using the recognition engine, based on the received input, the determined partial location data for each part of the at least one portion of the object, the at least one field value for each part of the at least one portion of the object, and, optionally, the at least one other information related to each part of the at least one portion of the object, generating a first information concerning the at least one portion of the object and providing the first information to the keying module;
using the keying module, generating an enhanced definition of the at least one portion of the object based on the first information received from the recognition engine and a second information concerning the at least one portion of the object stored by the keying module.

14. The method according to claim 13, wherein the input concerning the object is received from the user via the graphical user interface.

15. The method according to claim 13, wherein the input concerning the object includes an incomplete information about a location of and a field value for at least the portion of the object.

16. The method according to claim 15, wherein the incomplete information is provided to the recognition engine via the keying module for generating a precise location information and a precise field value information for the at least the portion of the object;
wherein the precise location and field value information for the at least the portion of the object are provided to the keying module.

17. The method according to claim 16, wherein the second information concerning the at least the portion of object includes object and data model definitions;
wherein based on the object and data model definitions and the location and field value information, the keying module generates enriched object definitions and provides document and data model visualization to the user.

18. The method according to claim 13, further comprising pre-processing, using the keying module, the at least the portion of the object; and
displaying information concerning the at least the portion of the object.

19. The method according to claim 18, further comprising allowing, using the keying module, a navigation within the object to locate the at least the portion of the object.

20. The method according to claim 13, wherein the object is a document containing at least one page and the at least the portion of the object is configured to represent a user-specified location on the at least one page.

21. The method according to claim 17, wherein the data model definition includes at least one of the following definitions: field information that may be entered by a user, organization of the field information into at least one group, and format of data that is to be imported and/or exported.

22. The method according to claim 13, further comprising performing, using the processor, at least one of the following functions: pre-processing of objects, locating blocks and columns of data having known types, and recognizing blocks and columns of data.

23. The method according to claim 13, further comprising providing, using the keying module, object control using at least one of the following: a recognition engine control and a graphical user interface control.

24. The method according to claim 13, wherein the object is configured to include at least one of the following characters: handwritten, typewritten/machine-written, drawn, painted, stamped, imprinted, imbedded, or contained within the object in any other form.

25. A non-transitory computer program product stored on a computer-readable medium, for use with a computer configured to process documents, the computer program product comprising computer-readable instructions for causing the computer to:
display an object on a graphical user interface;
receive an input from a user concerning the object, wherein the input relating to a plurality of parts of at least one portion of the object, wherein each part of the at least one portion is separately identified by the user in the received input;
provide the received input to a keying module;
using the keying module, based on the received input, a selectable list of object entities corresponding to the displayed object, and a predetermined data model corresponding to the displayed object,
determine partial location data for each part of the at least one portion of the object, at least one field value for each part of the at least one portion of the object, and, optionally, at least one other information related to each part of the at least one portion of the object, wherein at least one object entity corresponding to each part of the at least one portion of the object is selected from the selectable list of object entities, wherein the predetermined data model includes at least one field, at least one object entity, at least one object label, and at least one object tag; and
provide the received input, the determined partial location data for each part of the at least one portion of the object, the at least one field value for each part of the at least one portion of the object, and, optionally, the at least one other information related to each part of the at least one portion of the object to a recognition engine, the recognition engine being in communication with the keying module;

using the recognition engine, based on the received input, the determined partial location data for each part of the at least one portion of the object, the at least one field value for each part of the at least one portion of the object, and, optionally, the at least one other information related to each part of the at least one portion of the object, generate a first information concerning the at least one portion of the object and provide the first information to the keying module;

using the keying module, generate an enhanced definition of the at least one portion of the object based on the first information received from the recognition engine and a second information concerning the at least one portion of the object stored by the keying module.

26. The computer program product according to claim 25, wherein the input concerning the object is received from the user via the graphical user interface.

27. The computer program product according to claim 25, wherein the input concerning the object includes an incomplete information about a location of and a field value for the at least the portion of the object.

28. The computer program product according to claim 27, wherein the incomplete information is provided to the recognition engine via the keying module for generating a precise location information and a precise field value information for the at least the portion of the object;
wherein the precise location and field value information for the at least the portion of the object are provided to the keying module.

29. The computer program product according to claim 28, wherein the second information concerning the at least the portion of the object includes object and data model definitions;
wherein based on the object and data model definitions and the location and field value information, the keying module generates enriched object definitions and to provide document and data model visualization to the user.

30. The computer program product according to claim 25, wherein the keying module pre-processes the at least the portion of the object and displays a third information concerning the at least the portion of the object.

31. The computer program product according to claim 30, wherein the keying module allows navigation within the object to locate the at least the portion of the object.

32. The computer program product according to claim 25, wherein the object is a document containing at least one page and the at least the portion of the object is configured to represent a user-specified location on the at least one page.

33. The computer program product according to claim 29, wherein the data model definition includes at least one of the following definitions: field information that may be entered by a user, organization of the field information into at least one group, and format of data that is to be imported and/or exported.

34. The computer program product according to claim 25, wherein the processor performs at least one of the following functions: pre-processing of objects, locating blocks and columns of data having known types, and recognizing blocks and columns of data.

35. The computer program product according to claim 25, wherein the keying module provides object control using at least one of the following: a recognition engine control and a graphical user interface control.

36. The computer program product according to claim 25, wherein the object is configured to include at least one of the following characters: handwritten, typewritten/machine-written, drawn, painted, stamped, imprinted, imbedded, or contained within the object in any other form.

37. The system according to claim 1, wherein the first information includes a precise location data and a field value for the at least the portion of the object.

38. The method according to claim 13, wherein the first information includes a precise location data and a field value for the at least the portion of the object.

39. The computer program product according to claim 25, wherein the first information includes a precise location data and a field value for the at least the portion of the object.

* * * * *